United States Patent
Larin et al.

(10) Patent No.: US 10,754,653 B2
(45) Date of Patent: Aug. 25, 2020

(54) METHODS AND APPARATUS FOR STORAGE AND TRANSLATION OF ENTROPY ENCODED SOFTWARE EMBEDDED WITHIN A MEMORY HIERARCHY

(71) Applicant: QUALCOMM Incorporated, San Diego, CA (US)

(72) Inventors: Sergei Larin, Austin, TX (US); Lucian Codrescu, Austin, TX (US); Anshuman Das Gupta, Austin, TX (US)

(73) Assignee: QUALCOMM Incorporated, San Diego, CA (US)

(*) Notice: Subject to any disclaimer, the term of this patent is extended or adjusted under 35 U.S.C. 154(b) by 1210 days.

(21) Appl. No.: 14/950,612

(22) Filed: Nov. 24, 2015

(65) Prior Publication Data

US 2016/0077835 A1 Mar. 17, 2016

Related U.S. Application Data

(62) Division of application No. 13/099,463, filed on May 3, 2011, now Pat. No. 9,201,652.

(51) Int. Cl.
*G06F 12/00* (2006.01)
*G06F 9/30* (2018.01)

(52) U.S. Cl.
CPC ...... *G06F 9/30178* (2013.01); *G06F 9/30149* (2013.01); *G06F 12/00* (2013.01); *G06F 2211/1014* (2013.01); *G06F 2212/401* (2013.01)

(58) Field of Classification Search
CPC ...................................... G06F 12/00
(Continued)

(56) References Cited

U.S. PATENT DOCUMENTS 5,463,750 A 10/1995 Sachs
5,924,125 A 7/1999 Arya
(Continued)

FOREIGN PATENT DOCUMENTS

CN 1393767 A 1/2003
CN 1529873 A 9/2004
(Continued)

OTHER PUBLICATIONS

International Preliminary Report on Patentability—PCT/US2012/036199—The International Bureau of WIPO—Geneva, Switzerland, dated May 6, 2013.
(Continued)

*Primary Examiner* — Gautam Sain
(74) *Attorney, Agent, or Firm* — Withrow & Terranova PLLC

(57) ABSTRACT

A system for translating compressed instructions to instructions in an executable format is described. A translation unit is configured to decompress compressed instructions into a native instruction format using X and Y indices accessed from a memory, a translation memory, and a program specified mix mask. A level 1 cache is configured to store the native instruction format for each compressed instruction. The memory may be configured as a paged instruction cache to store pages of compressed instructions intermixed with pages of uncompressed instructions. Methods of determining a mix mask for efficiently translating compressed instructions is also described. A genetic method uses pairs of mix masks as genes from a seed population of mix masks that are bred and may be mutated to produce pairs of offspring mix masks to update the seed population. A mix mask for efficiently translating compressed instructions is determined from the updated seed population.

17 Claims, 24 Drawing Sheets

(58) Field of Classification Search
USPC .......................................................... 711/100
See application file for complete search history.

(56) References Cited

U.S. PATENT DOCUMENTS

| | | | |
|---|---|---|---|
| 6,199,126 B1* | 3/2001 | Auerbach | ............. G06F 9/3017 |
| | | | 710/68 |
| 6,339,816 B1 | 1/2002 | Bausch | |
| 6,779,101 B1 | 8/2004 | Berg et al. | |
| 6,801,996 B2 | 10/2004 | Banno et al. | |
| 6,975,773 B1 | 12/2005 | Govindaswamy et al. | |
| 7,249,248 B2 | 7/2007 | Vinnnakota et al. | |
| 7,406,585 B2 | 7/2008 | Rose et al. | |
| 2003/0217237 A1 | 11/2003 | Benveniste et al. | |
| 2004/0015931 A1* | 1/2004 | Larin | ....................... G06F 8/447 |
| | | | 717/158 |
| 2004/0019762 A1 | 1/2004 | Fukuoka et al. | |
| 2005/0050300 A1 | 3/2005 | May et al. | |
| 2005/0102489 A1 | 5/2005 | Kim et al. | |
| 2006/0150170 A1 | 7/2006 | Larin et al. | |
| 2006/0168424 A1 | 7/2006 | Leijten et al. | |
| 2006/0265572 A1 | 11/2006 | Stempel et al. | |
| 2007/0022279 A1 | 1/2007 | Wu et al. | |
| 2007/0162724 A1 | 7/2007 | Dytrych | |
| 2007/0174588 A1 | 7/2007 | Fuin | |
| 2008/0235492 A1 | 9/2008 | Baek et al. | |
| 2009/0313191 A1 | 12/2009 | Yao et al. | |
| 2010/0077141 A1* | 3/2010 | Achler | .................... H03M 7/30 |
| | | | 711/108 |
| 2010/0083001 A1 | 4/2010 | Shah et al. | |
| 2010/0223237 A1 | 9/2010 | Mishra et al. | |
| 2011/0083001 A1 | 4/2011 | Larin et al. | |
| 2013/0031337 A1 | 1/2013 | Larin et al. | |

FOREIGN PATENT DOCUMENTS

| | | |
|---|---|---|
| CN | 1531235 A | 9/2004 |
| CN | 101010666 A | 8/2007 |
| CN | 101075903 A | 11/2007 |
| CN | 101114217 A | 1/2008 |
| CN | 101286744 A | 10/2008 |
| CN | 100492279 C | 5/2009 |
| CN | 101488084 A | 7/2009 |
| CN | 101969362 A | 2/2011 |
| JP | H0440525 A | 2/1992 |
| JP | H07168694 A | 7/1995 |
| JP | H08161169 A | 6/1996 |
| JP | H0916471 A | 1/1997 |
| JP | H1153186 A | 2/1999 |
| JP | H1185512 A | 3/1999 |
| JP | 2002007211 A | 1/2002 |
| JP | 2002506264 A | 2/2002 |
| JP | 2003167732 A | 6/2003 |
| JP | 2004519028 A | 6/2004 |
| JP | 2005535974 A | 11/2005 |
| JP | 2006500673 A | 1/2006 |
| JP | 2007514245 A | 5/2007 |
| JP | 2008535528 A | 9/2008 |
| JP | 2014513366 A | 5/2014 |
| WO | 2004036501 A2 | 4/2004 |
| WO | 2005059738 A2 | 6/2005 |
| WO | 2009061814 A2 | 5/2009 |

OTHER PUBLICATIONS

International Search Report and Written Opinion—PCT/US2012/036199—ISA/EPO—dated Sep. 19, 2012.
International Search Report and Written Opinion—PCT/US2012/048904—ISA/EPO—dated Sep. 7, 2012.
Larin et al., "Methods and Apparatus for Storage and Translation of Entropy Encoded Software Embedded within a Memory Hierarchy", U.S. Appl. No. 13/099,463, filed May 3, 2011, 89 of pages.
Seok-Won Seong et al., "Bitmask-Based Code Compression for Embedded Systems", IEEE Transactions on Computer Aided Design of Integrated Circuits and Systems, IEEE Service Center, Piscataway, NJ, US, vol. 27, No. 4, Apr. 1, 2008 (Apr. 1, 2008), pp. 673-685, XP011206308.
Simonen, et al., "Variable-Length Instruction Compression for Area Minimization," Institute of Digital and Computer Systems, Tampere Univ. of Technol., Finland, Application-Specific Systems, Architectures, and Processors, 2003, IEEE International Conference on, Jun. 24-26, 2003, pp. 155-160.
Wolf W, "Computers as Components," Principles of Embedded Computer System Design, Japan, Nikkei Business Publications, Inc., Mar. 16, 2009, first edition, p. 330.

* cited by examiner

METHODS AND APPARATUS FOR STORAGE AND TRANSLATION OF ENTROPY ENCODED SOFTWARE EMBEDDED WITHIN A MEMORY HIERARCHY

RELATED APPLICATION

The present application for patent claims priority from and is a divisional application of U.S. patent application Ser. No. 13/099,463 entitled "METHODS AND APPARATUS FOR STORAGE AND TRANSLATION OF ENTROPY ENCODED SOFTWARE EMBEDDED WITHIN A MEMORY HIERARCHY," filed May 3, 2011, assigned to the assignee hereof and hereby expressly incorporated by reference herein.

FIELD OF THE INVENTION

The present invention relates generally to processors having compressed instruction sets for improving code density in embedded software, and more specifically to techniques for generating compressed instructions, storing the compressed instructions, and translating the compressed instructions.

BACKGROUND OF THE INVENTION

Many portable products, such as cell phones, laptop computers, personal digital assistants (PDAs) or the like, require the use of a processor executing a program supporting communication and multimedia applications. The processing system for such products includes one or more processors, each with storage for instructions, input operands, and results of execution. For example, the instructions, input operands, and results of execution for a processor may be stored in a hierarchical memory subsystem consisting of a general purpose register file, multi-level instruction caches, data caches, and a system memory.

In order to provide high code density a native instruction set architecture (ISA) may be used having two instruction formats, such as a 16-bit instruction format that is a subset of a 32-bit instruction format. In many cases, a fetched 16-bit instruction is transformed by a processor into a 32-bit instruction prior to or in a decoding process which allows the execution hardware to be designed to only support the 32-bit instruction format. The use of 16-bit instructions that are a subset of 32-bit instructions is a restriction that limits the amount of information that can be encoded into a 16-bit format. For example, a 16-bit instruction format may limit the number of addressable source operand registers and destination registers that may be specified. A 16-bit instruction format, for example, may use 3-bit or 4-bit register file address fields, while a 32-bit instruction may use 5-bit fields. Processor pipeline complexity may also increase if the two formats are intermixed in a program due in part to instruction addressing restrictions, such as branching to 16-bit and 32-bit instructions. Also, requirements for code compression vary from program to program making a fixed 16-bit instruction format chosen for one program less advantageous for use by a different program. In this regard, legacy code for existing processors may not be able to effectively utilize the two instruction formats to significantly improve code density and meet real time requirements. These and other restrictions limit the effectiveness of reduced size instructions having fields that are subsets of fields used in the standard size instructions.

SUMMARY OF THE DISCLOSURE

Among its several aspects, embodiments of the invention addresses a need to decouple a program using a native instruction set from a compressed program using a compressed instruction set. The techniques addressed herein allow highly efficient utilization of storage and a transmission conduit for embedded software without affecting the software's execution time and efficiency.

To such ends, an embodiment of the invention applies a method for decompressing instructions. Compressed instructions are fetched from a memory, wherein each compressed instruction comprises an X-index and a Y-index. For each compressed instruction an X-bit pattern is fetched from an X memory using the X-index and a Y-bit pattern is fetched from a Y memory using the Y-index. The X-bit pattern is combined with the Y-bit pattern based on a mix mask associated with each compressed instruction into a decompressed instruction, wherein a format length of the decompressed instruction is determined by the associated mix mask.

Another embodiment of the invention addresses an apparatus for translating compressed instructions stored in a virtual memory system. A paged instruction cache is configured to store pages of compressed instructions intermixed with pages of uncompressed instructions. An instruction translation look aside buffer (TLB) is configured to store an address translation entry that identify a page in the paged cache as storing compressed instructions.

Another embodiment of the invention addresses a system for translating compressed instructions to an executable format. A memory is configured to store an X-index and a Y-index for each compressed instruction of program code. A translation unit is configured to receive compressed instructions from the memory, for each received compressed instruction to select an X-bit pattern and a Y-bit pattern from a translation memory using the X-index and the Y-index, and to use a program specified mix mask for combining the selected X-bit pattern and Y-bit pattern into a native instruction format. A level 1 cache is configured to store the native instruction format for each compressed instruction.

Another embodiment of the invention addresses a method of determining a mix mask for efficiently translating compressed instructions. Pairs of seed mix masks represented as genes from a seed population of seed mix masks are bred to produce pairs of offspring mix masks. The offspring mix masks are mutated to produce mutated offspring mix masks that update the seed population. The mix mask is determined from the updated seed population, wherein patterns of bits are combined according to the determined mix mask to translate compressed instructions of a program to executable form.

A more complete understanding of the embodiments of the invention, as well as further features and advantages of the invention, will be apparent from the following Detailed Description and the accompanying drawings.

DETAILED DESCRIPTION

The present invention will now be described more fully with reference to the accompanying drawings, in which several embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Computer program code or "program code" for being operated upon or for carrying out operations according to the teachings of the invention may be initially written in a high level programming language such as C, C++, JAVA®, Smalltalk, JavaScript®, Visual Basic®, TSQL, Perl, or in various other programming languages. A source program or source code written in one of these languages is compiled to a target processor architecture by converting the high level program code into a native assembler program using instructions encoded in a native instruction format. Programs for the target processor architecture may also be written directly in a native assembler language. The native assembler program uses instruction mnemonic representations of machine level binary instructions. Program code or computer readable medium produced by a compiler or a human programmer as used herein refers to machine language code such as object code whose format is understandable by a processor.

Figure 1:
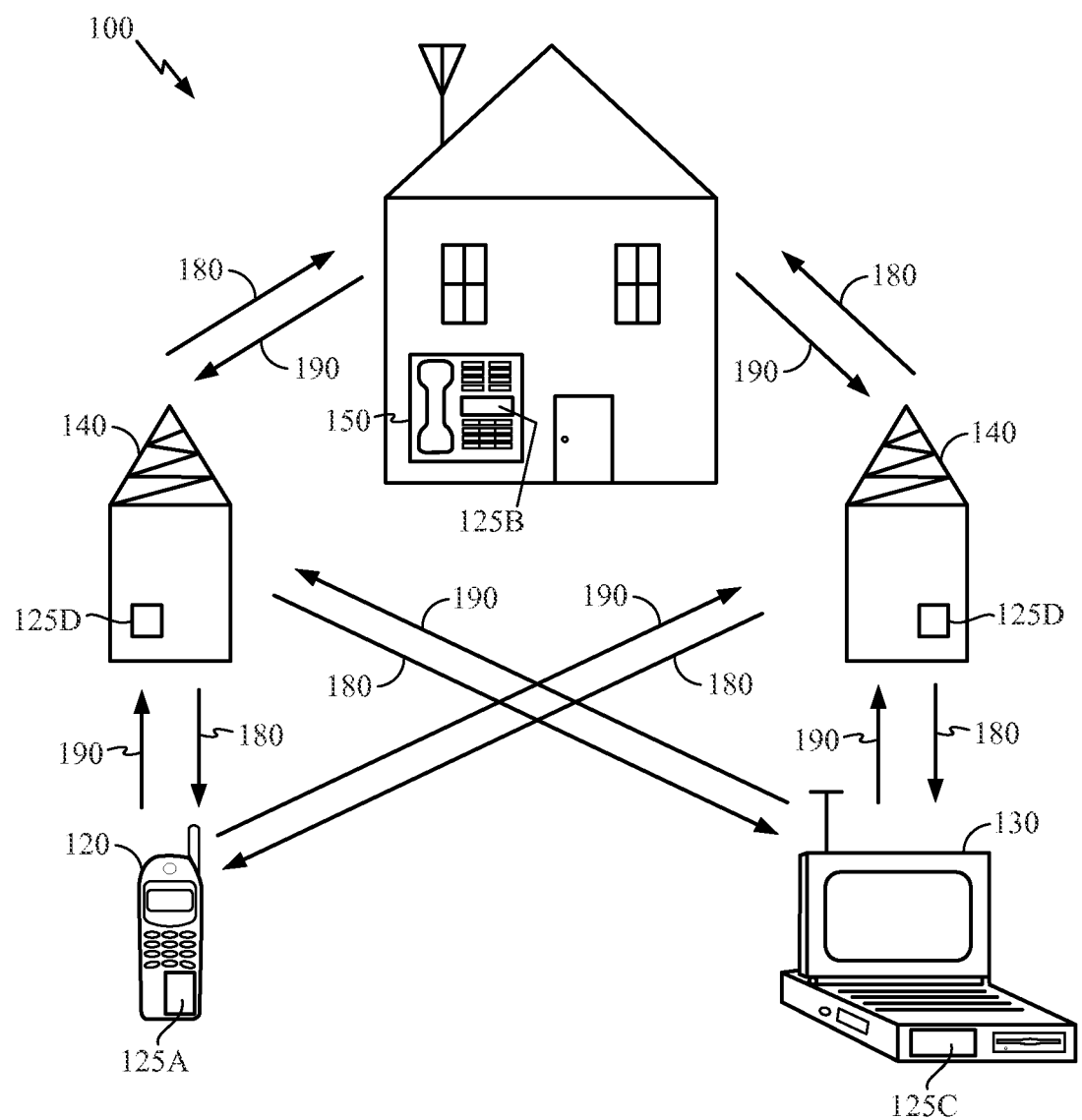
FIG. 1 is a block diagram of an exemplary wireless communication system in which an embodiment of the invention may be advantageously employed.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, 150, and base stations 140 which include hardware components, software components, or both as represented by components 125A, 125C, 125B, and 125D, respectively, have been adapted to embody the invention as discussed further below. FIG. 1 shows forward link signals 180 from the base stations 140 to the remote units 120, 130, and 150 and reverse link signals 190 from the remote units 120, 130, and 150 to the base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, handheld personal communication system (PCS) units, portable data units such as personal digital assistants, or fixed location data units such as meter reading equipment. Although FIG. 1 illustrates remote units according to the teachings of the disclosure, the disclosure is not limited to these exemplary illustrated units. Embodiments of the invention may be suitably employed in any processor system.

Figure 2:
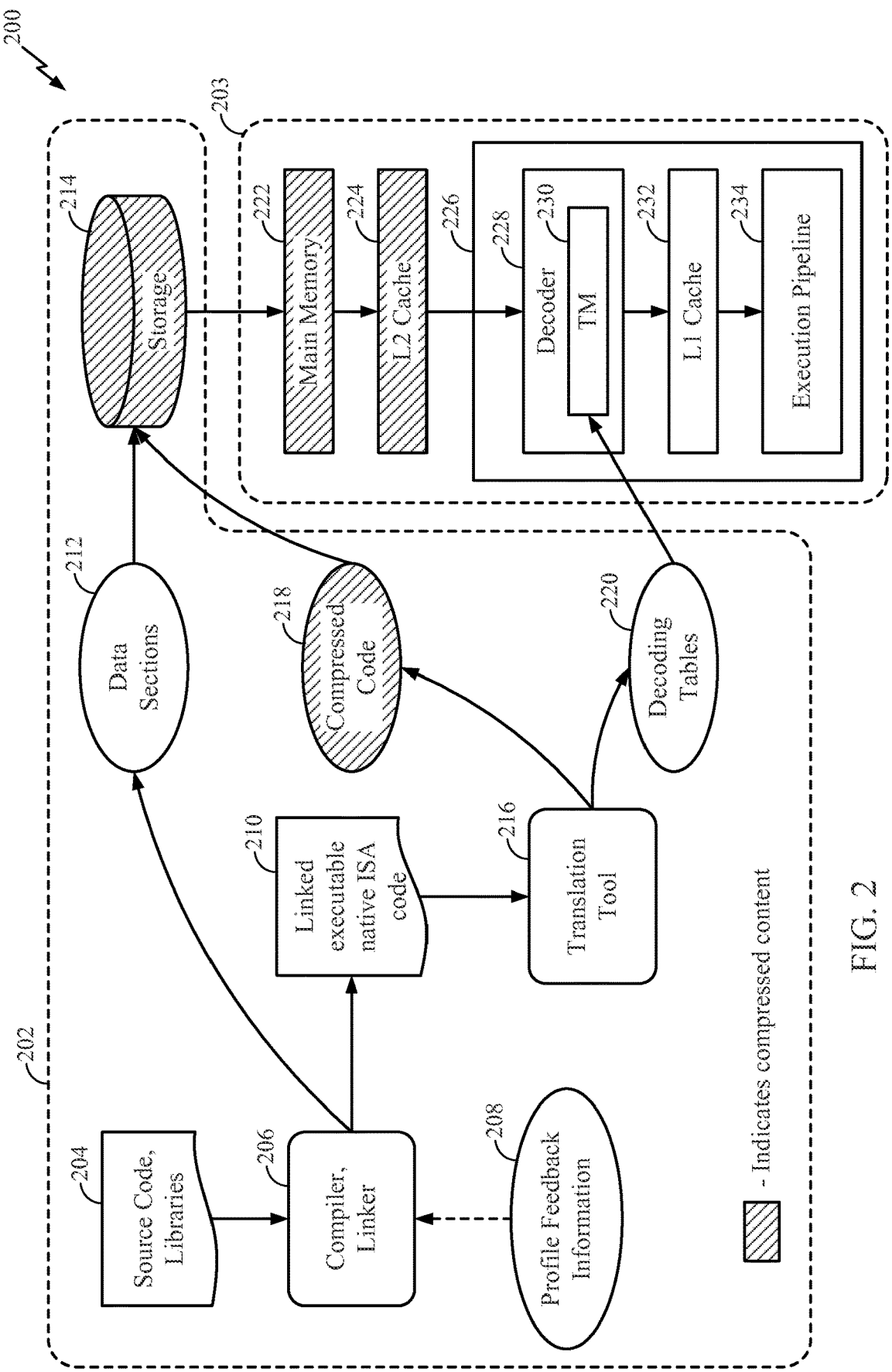
FIG. 2 is a system for code compression designed for run time decompression in accordance with an embodiment of the invention.

FIG. 2 is a compression system 200 for code compression designed for run time decompression in accordance with embodiments of the invention. The compression system 200 includes source code as described above and binary library files in uncompressed form in source code and library files 204 which comprise the current program application being compiled. The compression system 200 also includes a compiler and linker 206 and optional profile feedback information 208, which are used to generate linked executable code 210 based on native instruction set architecture (ISA) formats and supporting data sections 212. The native ISA is represented by a fixed, uncompressed format and can represent a variety of approaches, including, for example, fixed 64 or 32 or 16-bit encodings and a mixture of such encodings. The native ISA is developed for general utility and not specifically tailored for a particular application. By maintaining fixed word boundaries, such as 32-bit instruction word boundaries, an addressing model that supports only fixed word addresses for branches, calls, returns, and the like may be used even though 16-bit and 32-bit instructions may be mixed together in the code.

Instructions selected from such an ISA may be compressed and tailored to the current application while maintaining addressability of the code and guaranteeing fast, fixed latency decompression time. Such compression may be automated to produce the compressed code in linear time. The original ISA by its very generalized nature has low informational entropy, which is increased in accordance with an embodiment by producing a custom entropy bounded encoding for the given source code and library files 204. Informational entropy in the present context is defined as a measure of informational content in a current representation of a program. The informational entropy may be viewed as a ratio of the current representation of the program using native instruction symbols and a shortest possible representation of the program using compressed symbols which preserves the original functionality of the program. The granularity of the alphabet used to create a compressed program is at an individual byte level, as an atomic storable and addressable entity in a computational system. The informational content that is preserved in both program representations is the original functionality of the program. For example, an entropy of "1" may represent one specific exact program in its shortest possible representation. A program having an entropy less than "1" indicates that more than one program may be supported and possibly a very large number of programs may be supported which requires an increased storage capacity in the memory.

In FIG. 2, the linked executable code 210 is provided as input to a translation tool 216 which generates compressed code 218 and decoding tables 220. The compressed code 218 and the supporting data sections 212 are stored in a storage device 214, such as a hard disk, optical disk, flash memory of an embedded device or other such storage medium from which selected code may be provided to a processor complex 203 for execution. The processor complex 203 includes a main memory 222, a level 2 cache (L2 cache) 224, and a processor core 226. The processor core 226 includes a decoder 228 having translation memory (TM) 230 in accordance with the an embodiment, a level 1 instruction cache (L1 Icache) 232, and an execution pipeline 234. Compressed code is stored in the storage device 214, main memory 222, and the L2 cache 224. Decompressed code is stored in the L1 cache and executed by the execution pipeline 234. Various embodiments of the translation tool 216 for generating the compressed code 218 and for decoding compressed instructions in decoder 228 are described in more detail below.

The processor complex 203 may be suitably employed in hardware components 125A-125D of FIG. 1 for executing program code that is stored in uncompressed form in the L1 Icache 232 and stored in compressed form in the L2 cache 224 and main memory 222. Peripheral devices which may connect to the processor complex are not shown for clarity of discussion. The processor core 226 may be a general purpose processor, a digital signal processor (DSP), an application specific processor (ASP) or the like. The various components of the processing complex 203 may be implemented using application specific integrated circuit (ASIC) technology, field programmable gate array (FPGA) technology, or other programmable logic, discrete gate or transistor logic, or any other available technology suitable for an intended application. Though a single processor core 226 is shown, the processing of compressed instructions of an embodiment of the invention is applicable to superscalar designs and other architectures implementing parallel pipelines, such as multi-threaded, multi-core, and very long instruction word (VLIW) designs.

Figure 3:
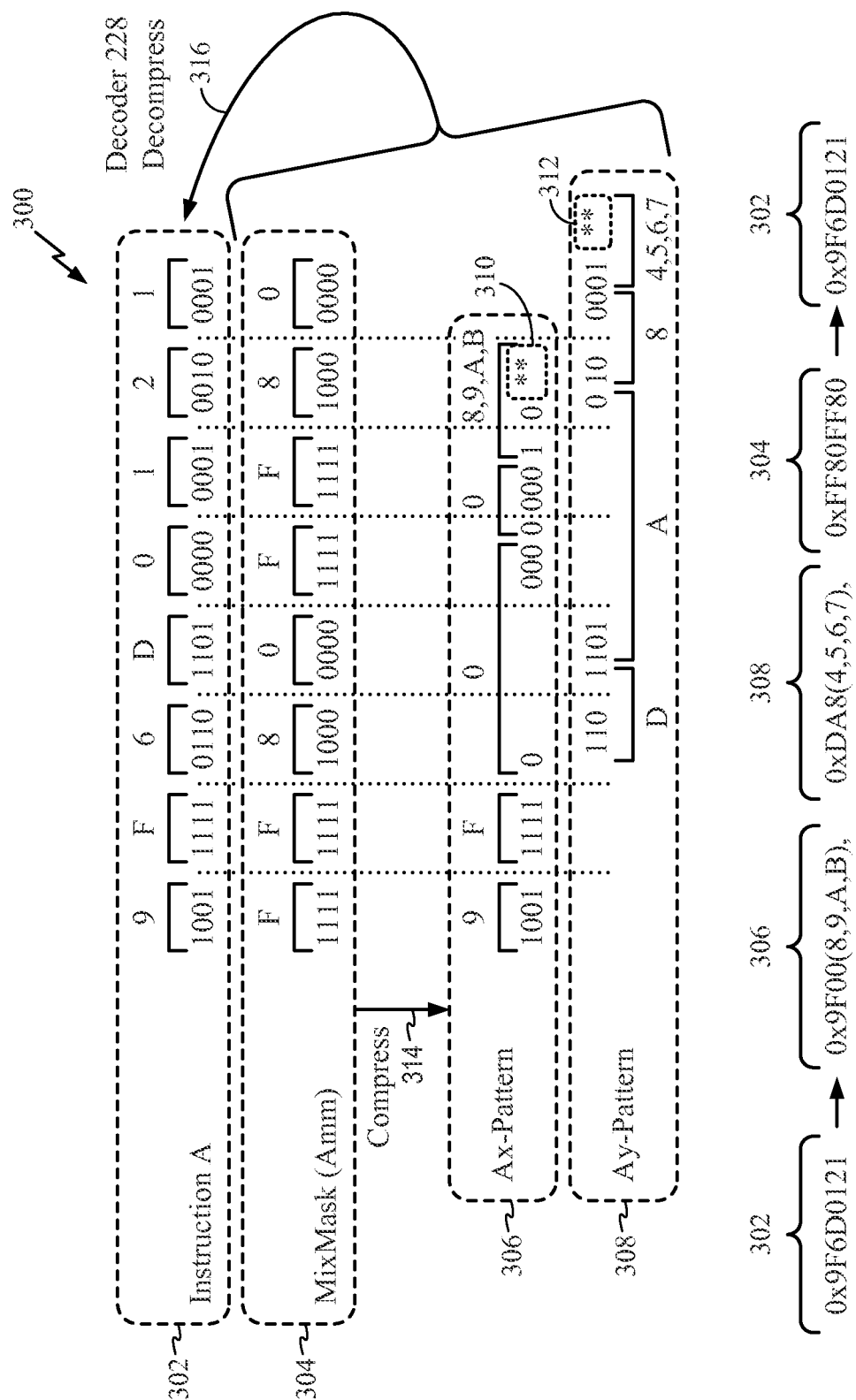
FIG. 3 illustrates exemplary elements of an instruction partition process that splits an instruction based on a mix mask into an X pattern and a Y pattern with byte overlap pad bits in accordance with an embodiment of the invention.

FIG. 3 illustrates exemplary elements 300 of an instruction partition process that splits an original ISA fixed size instruction A 302 based on a binary mix mask (MM) 304 into an Ax pattern 306 and an Ay pattern 308 with overlap pad bits 310 and 312 in accordance with an embodiment of the invention. Pad bits are produced due to requirements imposed by modern memory systems to represent instructions and data at least in byte granularity segments. The use of formats having byte granularity segments is utilized to provide a compacted representation allowing storage overlap on bit granularity while satisfying byte granularity requirements of the storage system.

To compress an original ISA code segment, the code segment is partitioned into groups of instructions, with each group contributing a single shared X pattern and a set of unique Y patterns. The Ax pattern 306 represents a bit pattern that is common to a group of instructions to which instruction A belongs. The Ay pattern 308 represents a bit pattern embodying the differences between the instruction A 302 and the Ax pattern 306. Note, that a code segment can be partitioned into any number of groups between one and N, where N is the number of original instructions in the code segment. The process to determine an optimal or near optimal number of groups and an optimal or near optimal mix mask is described further below. The X patterns for the code segment are stored in an X dictionary comprised of an X memory and the Ay patterns for the code segment are stored in a Y dictionary comprised of a Y memory. An X index is an address of a location in the X memory and a Y index is an address of a location in the Y memory. A combination of these two indexes, patterns from the X and the Y dictionaries and the binary mix mask deterministically represents the original instruction. Byte addressable X/Y dictionary patterns are stored in X/Y memory in compacted form yet are accessible without variable length decompression. Variable length decompression is based on a process of reverse mapping variable length compressed symbols into a native fixed sized alphabet. Fixed size index compression is used for this representation and discussed later. A compress operation 314 uses at least one mix mask 304 for the code segment to select from an instruction 302 an Ax pattern 306 and an Ay pattern 308. In the following examples, a hexadecimal number or Hex number is represented with a '0x' prefix. For example, the instruction 302 [0x9F6D0121] is combined with the mix mask 304 [0xFF80FF80] to produce the Ax pattern 306 [0x9F00(8,9,A,B)] and the Ay pattern 308 [0xDA8(4,5,6,7)]. The numbers in parenthesis, for example (8,9,A,B) represent a set of possible numbers from which one number may be selected for a particular 4-bit position because of two "don't care" states of the overlap pad bits 310. A decoder 228 decompress operation 316 uses the at least one mix mask for the code segment, an X index fetched X memory pattern and a Y index fetched Y memory pattern to decompress the compressed instruction. For example, the mix mask 304 [0xFF80FF80] is combined with the Ax pattern 306, [0x9F00(8,9,A,B)] fetched from the X memory, and the Ay pattern 308, [0xDA8(4,5,6,7)] fetched from the Y memory, to produce the original instruction 302 [0x9F6D0121].

As described above, the X patterns and Y patterns are stored in a byte addressable X memory and a byte addressable Y memory, respectively. Index compression of X patterns, Y patterns, or both, makes use of a process that eliminates duplicate X patterns and duplicate Y patterns and overlaps pad bits, such as the overlap pad bits 310 and 312 in a byte addressable location, thus reducing double utilization of physical storage. A first X pattern may be overlapped with a second X pattern by sharing ending bits of the first X pattern with beginning bits of the second X pattern. In this comparison, the byte having overlapped pad bits allows a further range of options, such as indicted in FIG. 3. For example, the Ax pattern 306 is comprised of three bytes including a first byte 0x9F, a second byte 0x00, and a third byte comprised of a first nibble having a value that is one of a set {8, 9, A, B}, due to the overlap pad bits 310, and a second nibble which may be any number from and including 0x00 to 0xFF. A second X pattern to be overlapped with the first Ax pattern 306 would have one of the set {8, 9, A, B} in a first nibble of beginning bits and any number from and including 0x00 to 0xFF in a second nibble of beginning bits. Another possible overlap pattern for a third X pattern to be overlapped with the first Ax pattern 306 has 0x00 in a first byte of beginning bits, one of the set {8, 9, A, B} in a next nibble of beginning bits and any number from and including 0x00 to 0xFF in the next consecutive nibble of beginning bits. For Y patterns, the Ay pattern 308 is comprised of two bytes including a first byte 0xDA and a second byte comprised of a first nibble 0x8 and a second nibble which may be one of the set {4, 5, 6, 7} due to the overlap pad bits 312. With such capabilities, it is possible to store four uncompressed instructions in a 128-bit line and for a 32-bit to 16-bit compression with padding and overlap be able to store more than eight compressed instructions in the same space. For example, if four of the compressed instructions could be stored with a byte overlap, ten 16-bit compressed instructions could be stored in the 128-bit line. Thus, the addressing space is compressed and the index addressing would also be compressed as compared to the approach without padding. A second Y pattern to be overlapped with the first Ay pattern 308 would have an '0x8' in a first nibble of beginning bits and a second nibble that is one of the set {4, 5, 6, 7}. With a single mix mask, all X patterns are of the same number of bits and all Y patterns are of the same number of bits. With a large number of X and Y patterns, it is possible to have a variety of mappings, with only few mappings taking the least storage, which are considered near optimal or acceptable mappings. The selection of an optimal or near optimal mapping is an NP complete problem, and could not be practically solved for any significant numbers of X and Y patterns. Nevertheless the current invention uses a heuristic that produces an acceptable mapping in a linear time.

Figure 4:
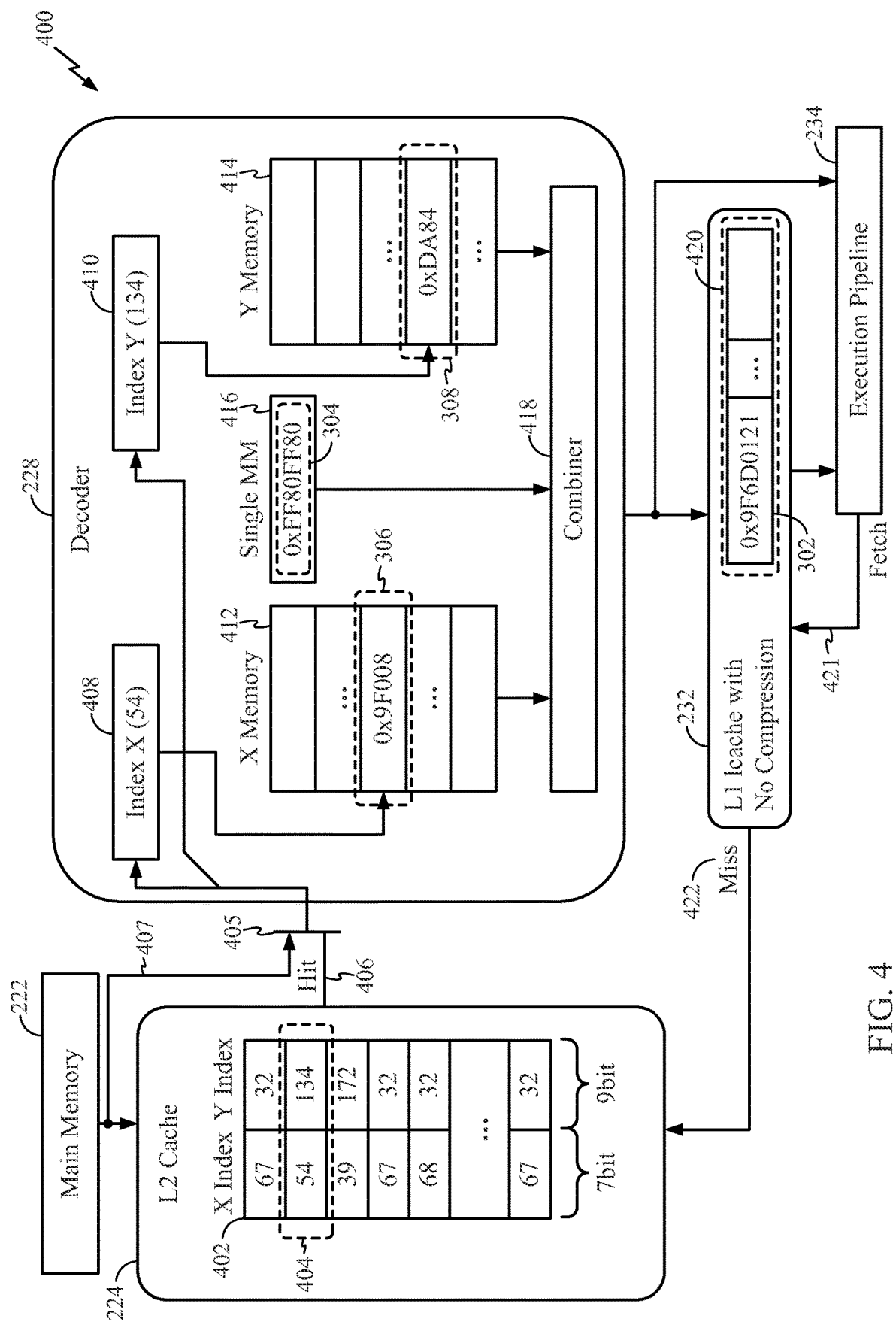
FIG. 4 is a decomposer system having programs stored in compressed form in main memory and a level 2 cache that are decompressed to be stored in a level 1 cache in accordance with an embodiment of the invention.

FIG. 4 is a decompressor system 400 having programs stored in compressed form in the main memory 222 and the L2 cache 224 that are decompressed to be stored in the L1 Icache 232 in accordance with an embodiment of the invention. The L2 cache 224 includes XY index memory 402 that stores an X index and a Y index pair in addressable locations, such as XY entry 404 having a 7-bit X index value of 0x54 and a 9-bit Y index value of 0x134. A multiplexer 405 is used to select an XY entry on an L2 cache hit 406 or an XY value 407 from main memory 222 on a miss in L2 cache 224. The decompression operation is accomplished in the decoder 228 having index X register 408, index Y register 410, X memory 412, Y memory 414, single MM register 416, and a combiner 418. The L1 Icache 232 includes a plurality of cache lines, such as cache line 420 holding uncompressed instructions.

At program loading or in an embedded system boot process, main memory 222 is loaded with compressed code, X memory 412 and Y memory 414 are loaded with an associated X and Y dictionary context and the single binary mix mask is set in MM register 416. Note, that the X and Y memory context as well as mix mask can be reloaded during execution if needed. This reload can constitute further granularity of the original code segment in yet smaller sections each with the its custom encoding. For instance, some complex embedded systems, such as smart phones, can invoke multiple independent children applications from a main application, which do not share code space and are self contained. Each such application can have its own custom encoding comprised of an X/Y dictionary and a MM, which is loaded at child process startup.

A good example of such scenario would be a smart phone operating system (OS) starting an e-mail handling application which for duration of its execution takes over a majority of system resources, and executes code only belonging to the e-mail handling application for a considerable stretch of time. A custom encoding for the e-mail application is loaded at startup, and replaced with a different OS custom encoding only once the e-mail application has finished operation. Furthermore, a possible scenario is when a single dictionary is used for the OS and e-mail handling application, but different sections are utilized via adjusting index X (408) and/or index Y (410) register contents to offset into the appropriate section of the X/Y dictionary. Loading of the index X (408) and/or index Y (410) register contents may be achieved via a system level request by an OS interrupt, for example, or via a special instruction encoded along with the application code, which is understood by a processor as a request for reloading of the index X (408) and/or index Y (410) register contents. In this case, the number of decoding tables 220 is equal to the number of program segments with different encoding possible for simultaneous residence in L2. Using the above smart phone example, if the OS is dedicated to its own decoder 228 having a translation memory (TM) 230 that always holds OS specific encodings, the system can incorporate another, application specific TM 230 which holds a different encoding, customized for the utilized system applications. Determining which translation memory 230 is appropriate may be made via TLB entries on per code page basis. In contrast, if only one TM 230 is designed in the system, the following procedure may be appropriate depending on the capacity of the installed TM 230. If multiple independent encodings, which exceed the capacity of the OS TM 230, are still desired, as in the above example, once the OS starts the e-mail handling application, a new X/Y dictionary is placed into X/Y Memory (412,414). The MM register 416 may be updated and a L2/TLB flush request is issued. The L2/TLB flush request invalidates the compressed code corresponding to the OS in L2/TLB. For the remainder of the description, a decompressor system 400 is described using a decoder 228 having a single TM 230 and a single encoding to be used for the whole system including any application code.

Next, the execution pipeline 234 begins fetching instructions from the L1 Icache 232. Initially, each access to the L1 Icache may generate a miss indication 422 causing an access to the L2 cache 224. Initially, the access to the L2 cache 224 may also generate a miss causing an access to main memory 222 which responds with a compressed instruction that is loaded in the L2 cache 224 and forwarded to the decoder 228 through multiplexer 405. The decoder 228 decompresses the XY index compressed instruction to an uncompressed format for storage in the L1 Icache 232 and for execution in the execution pipeline 234 as described with regard to the decompress operation 316 of FIG. 3. After a period of operation, the L1 Icache 232 and L2 cache 224 will have reached steady state.

From a processor perspective, the execution pipeline 234 attempts a fetch operation with a fetch address and control signals 421 of an instruction to be searched for in the L1 Icache 232. Initially, the L1 Icache 232 determines the instruction is not present and issues a miss indication 422 containing addressing and other information necessary for the L2 cache 224 to do a fetch operation for the instruction. The L2 cache fetch operation, for example, is for XY entry 404 which is a hit in the L2 cache 224 causing the XY entry 404 to be passed through multiplexer 405 to the decoder 228. The XY entry 404 is split with the X index value 0x54 received in the index X register 408 and the Y index value 0x134 received in the index Y register 410. The X pattern 306 fetched from the X memory 412 at address 0x54 is applied to the combiner 418. The Y pattern 308 fetched from the Y memory 414 at address 0x134 is also applied to the combiner 418. The single mix mask (MM) 304 [0xFF80FF80] stored in MM register 416 is further applied to the combiner 418. The combiner 418 combines the appropriate bits from the X pattern 306 with the appropriate bits from the Y pattern 308 according to the MM 304 to produce the original instruction 302 that is stored in cache line 420 and passed to the execution pipeline 234.

Another additional feature of such a system is program content stored in an implied encryption format. Even though no specific encryption type of data scrambling is performed on the instruction stream, program code is stored in the storage device 214, main memory 222, and the L2 cache 224 in an application specific and compressed form. Since part of the encoded state of the program code resides inside the processor core 226 in the TM 230, which is not easily externally accessible in a final product, the storage 214 and upper memory hierarchy 222 and 224 content is insufficient for restoring the original program, making it difficult to analyze or copy.

The processor core 226 may deal with multiple address spaces. The execution pipeline 234 may be operating in virtual address space, which is different from physical address space used throughout a memory hierarchy. The job of translation of one address space into another is generally performed by a translation look aside buffer (TLB) and is of reduced complexity if the physical address space contains instructions of the same size. Therefore, in accordance with an embodiment of the invention, an execution code segment is represented in fixed size pairs of X and Y indexes that in sum occupy a fixed byte aligned space. This approach, as described in more detail below, allows mixing compressed and uncompressed instructions based on a physical addressing space paging process, where a code page represent an atomic unit of code handled by a single entry of a TLB.

Figure 5A:
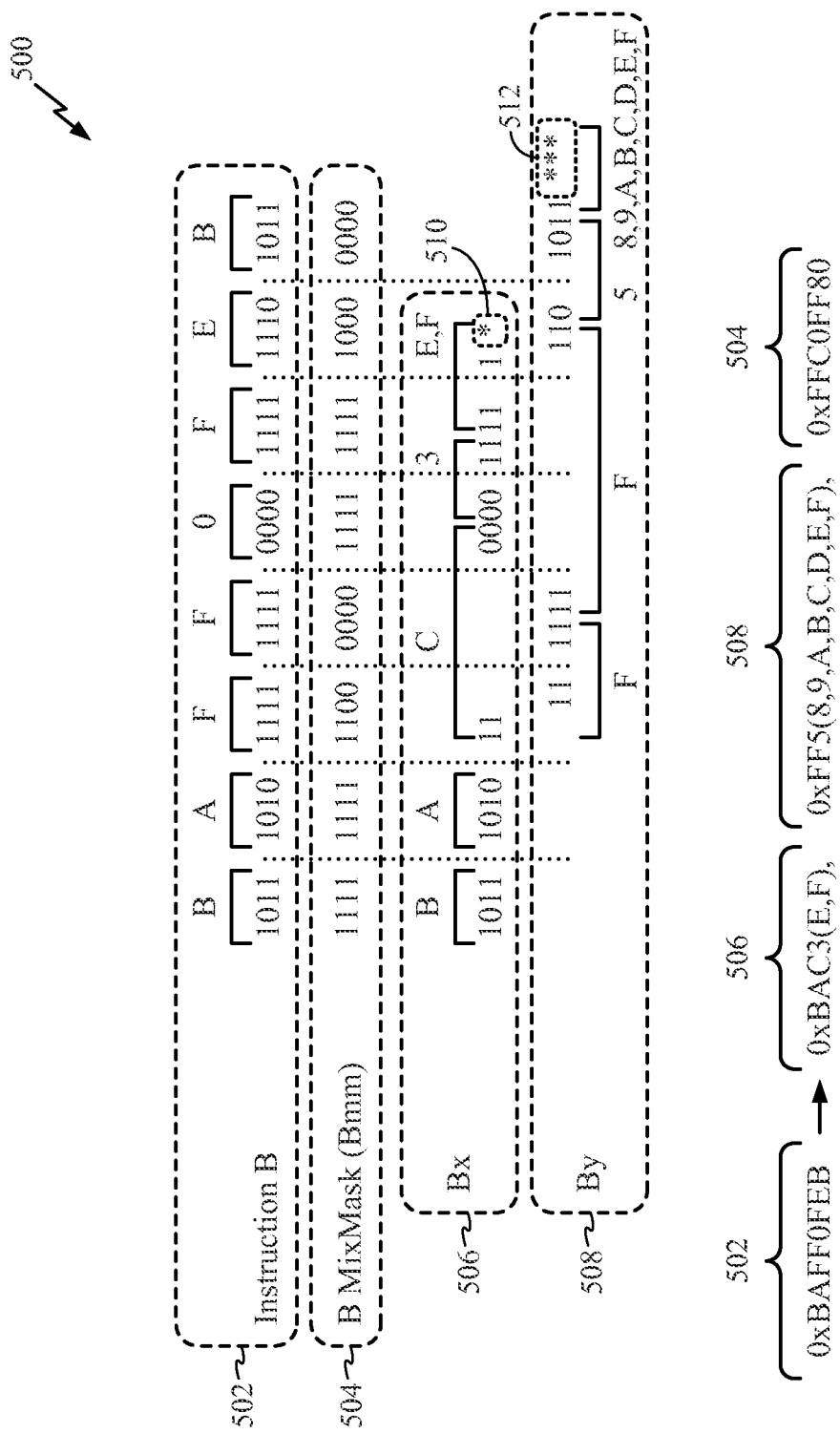
FIG. 5A illustrates exemplary elements of a second instruction partition process that splits a second instruction based on a second mix mask into a second X pattern and a second Y pattern with byte overlap pad bits in accordance with an embodiment of the invention.

FIG. 5A illustrates utilization of pad bits in placement of X and Y indexes into X and Y memory. Exemplary elements 500 of another instruction B partition process that splits the instruction B 502 based on a second mix mask 504 into a second X pattern 506 and a second Y pattern 508 with byte overlap pad bits in accordance with an embodiment of the invention. To compress a second code segment, the second code segment is partitioned into groups of instructions, with each group contributing a Bx pattern and a set of unique By patterns. The Bx pattern 506 represents a bit pattern that is common to a group of instructions from the second code segment. The By pattern 508 represents a bit pattern embodying the differences between the instruction B 502 and the Bx pattern 506. The Bx patterns for the code segment are stored in an X dictionary comprised of an X memory and the By patterns for the code segment are stored in a Y dictionary comprised of a Y memory. An X index is an address of a location in the X memory and a Y index is an address of a location in the Y memory. In a compression process, the instruction 502 [0xBAFF0FEB] is combined with the mix mask 504 [0xFFC0FF80] to produce the Bx pattern 506 [0xBAC3(E,F)] and the By pattern 508 [0xFF5(8,9,A,B,C,D,E,F)], for example. In a decompression process, the mix mask 504 [0xFFC0FF80] is combined with the Bx pattern 506, [0xBAC3(E,F)] fetched from the X memory, and the By pattern 508, [0xFF5(8,9,A,B,C,D,E,F)] fetched from the Y memory, to produce the original instruction 502 [0xBAFF0FEB], for example.

Figure 5B:
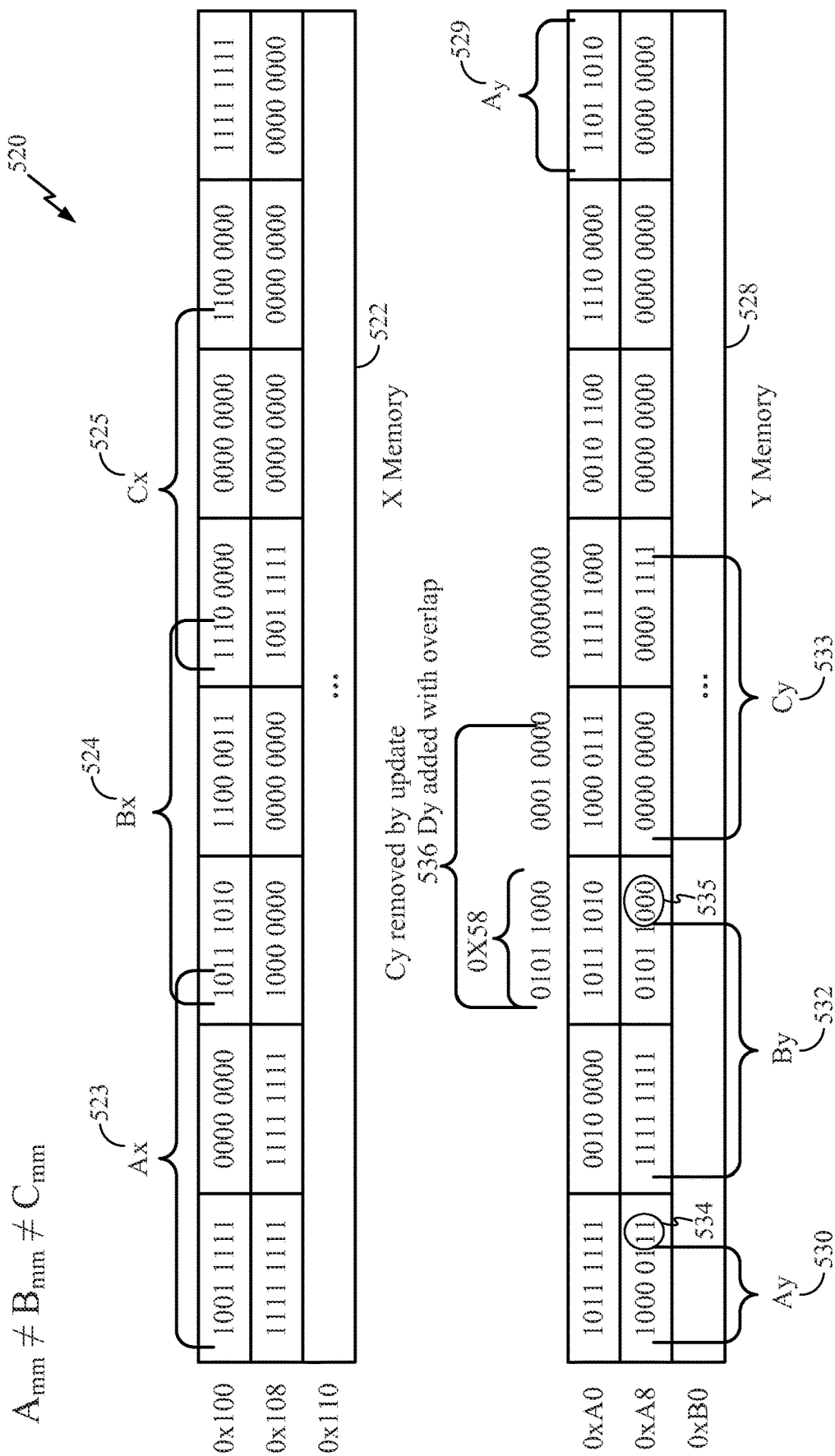
FIG. 5B illustrates an exemplary storage arrangement for the Ax, Ay patterns of FIG. 3 and the Bx, By patterns of FIG. 5A in an X memory and a Y memory having three different masks Amm≠Bmm≠Cmm in accordance with an embodiment of the invention.

FIG. 5B illustrates an exemplary storage arrangement 520 for the Ax, Ay patterns of FIG. 3, the Bx, By patterns of FIG. 5A and yet another instruction C represented here by Cx and Cy in an X memory 522 and a Y memory 528. The three instructions A, B and C have different masks Amm≠Bmm≠Cmm in accordance with an embodiment of the invention. For example, the X memory 522 and the Y memory 528 are byte addressable and utilize 64-bit access lines. The Ax pattern 306 [0x9F00(8,9,A,B)] is encoded in binary as Ax 523 [1001 1111 0000 0000 10], the Bx pattern 506 [0xBAC3 (E,F)] is encoded in binary as Bx 524 [1011 1010 1100 0011 111] and an exemplary Cx 525 is encoded in binary as Cx 525 [1110 0000 0000 0000 1]. In the exemplary storage arrangement 520 the lengths of mix masks Amm 304 [0xFF80FF80], Bmm 504 [0xFFC0FF80], and an exemplary Cmm [FF80FF00] are not equal. Thus, the X patterns associated with each mix mask are a different number of bits and the Y patterns also associated with each mix mask are a different number of bits.

Index compression of X patterns, Y patterns, or both, makes use of overlap pad bits, such as the overlap pad bits 310, 312, 510, and 512 and a byte addressable location. A first X pattern may be overlapped with a second X pattern by comparing ending bits of the first X pattern with beginning bits of the second X pattern. In this comparison, the byte having overlapped pad bits allows a further range of options, such as indicted in FIG. 5B. For example, the Ax pattern 523 is comprised of three bytes including a first byte 0x9F, a second byte 0x00, and a third byte comprised of a first nibble having a value that is one of a set {8, 9, A, B}, due to the overlap pad bits 310, and a second nibble which may be any number from and including 0x00 to 0xFF. The Bx pattern 524 is overlapped with the first Ax pattern 523 and has a value of 0xB, which is one of the set {8, 9, A, B}, in a first nibble of the Bx pattern 524. The second nibble of the Bx pattern 524 has the value 0xA which is a number from 0x00 to 0xFF. The beginning bits of the Cx pattern 525 is overlapped with the ending bits of the Bx pattern 524. For Y patterns, no overlap is shown for Ay 530, By 532, and Cy 533 in the Y memory 528. The bits between patterns, such as bits 534 and 535 may take on any binary value since they are not used in the compression or decompression process. If, due to code changes or additions, the Cy pattern 533 is removed, a new Dy pattern 536 may be generated having a first byte of 0x58, then the new Dy pattern 536 may be overlapped with the By pattern 532 as shown in FIG. 5B. Also, other patterns having a first byte of 0x5 and a second byte as one of the set {8,9,A,B,C,D,E,F} may be overlapped with the ending bits of the By pattern 532.

Figure 5C:
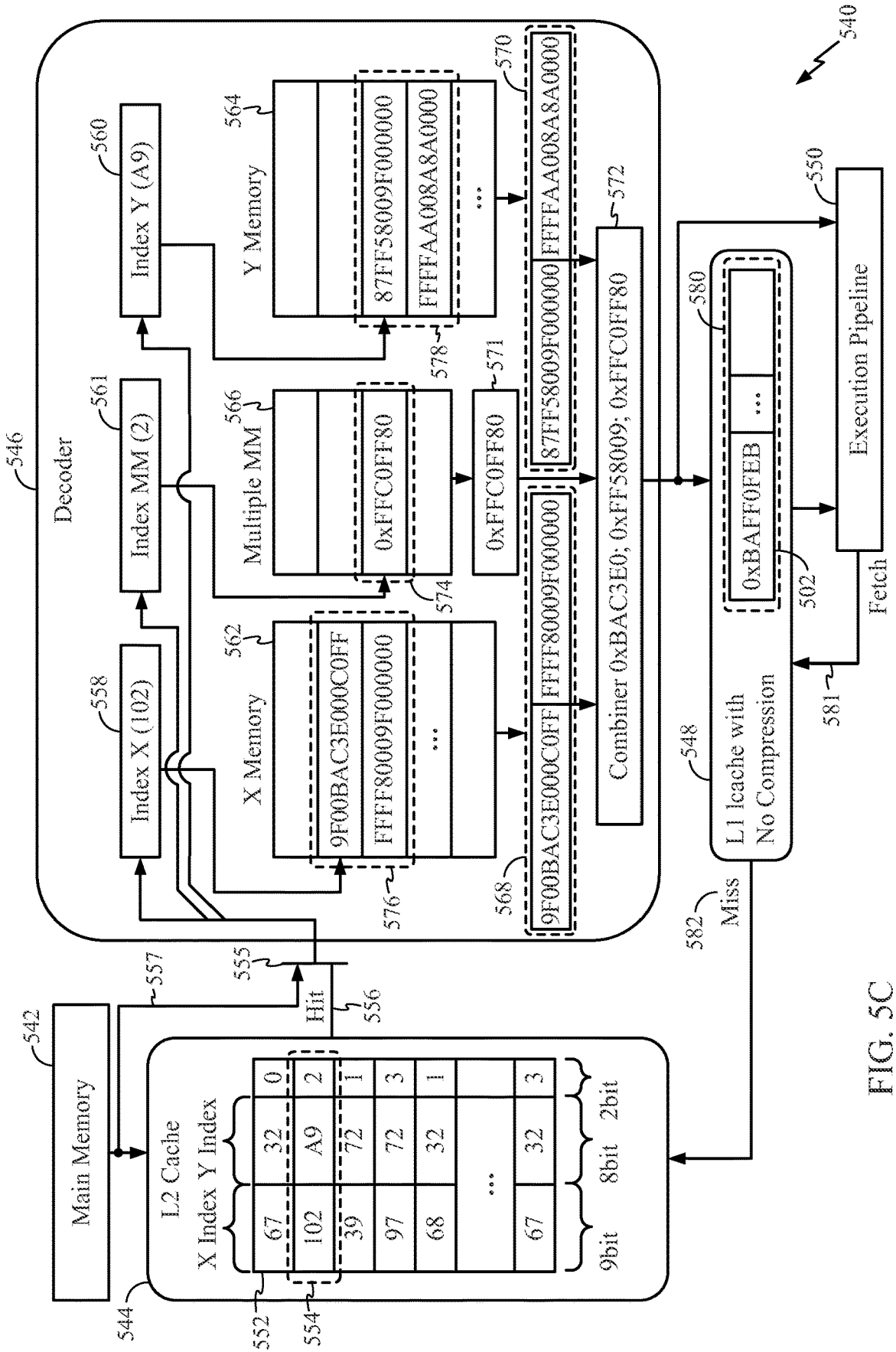
FIG. 5C is a decompressor system having programs stored in compressed form in main memory and a level 2 cache that are decompressed using multiple mix masks and index compression to be stored in a level 1 cache in uncompressed form in accordance with an embodiment of the invention.

FIG. 5C illustrates a decompressor system 540 having programs stored in compressed form in main memory 542 and a level 2 cache 544 that are decompressed in a decoder 546 using multiple mix masks and index compression to be stored in a level 1 instruction cache (L1 Icache) 548 in uncompressed form in accordance with an embodiment of the invention. The L2 cache 544 includes XYM index memory 552 that stores an X index, a Y index, and a mix mask index in addressable locations, such as XYM entry 554 having a 9-bit X index value of 0x102, an 8-bit Y index value of 0xA9, and a 2-bit M index value of 0x2. A multiplexer 555 is used to select an XYM entry on an L2 cache hit 556 or an XYM value 557 from main memory 542 on an L2 cache miss. The decompression operation is accomplished in the decoder 546 having index X register 558, index Y register 560, a MM index register 561, an X memory 562, Y memory 564, multiple MM memory 566, a double line X register 568, a double line Y register 570, and a combiner 572. In both register cases 568 and 570, double width storage is required to handle accesses to X/Y entries that span two lines in the X/Y Memories. Note that MM register 571 is not a double register since the size of the mask MM is fixed. The L1 Icache 548 includes a plurality of cache lines, such as cache line 580. After a period of initial operations, the L2 cache 544 and main memory 542 are loaded with compressed code, and the L1 Icache 548 is loaded with decompressed code.

When the execution pipeline 550 attempts a fetch 581 of an instruction from the L1 Icache 548 and determines that the instruction is not present, a miss indication 582 is issued and the fetch is redirected to the L2 cache 544. For example, the fetch is for XYM entry 554 which is a hit in the L2 cache 544 causing the XYM entry 554 to be passed through multiplexer 555 to the decoder 546. The XYM entry 554 is split with the X index value 0x102 received in the index X register 558, the Y index value 0xA9 received in the index Y register 560 and the M index value 0x2 received in the index MM register 561. A pair of lines 576 containing the X pattern 506 [0xBAC3E] is fetched from the X memory 562 starting at address 0x100 and loaded into the double line X register 568. The index 0x102 is a full byte offset for the X pattern 506. The X memory 562 is addressed with 8-byte granularity in this example, having 8 bytes per line. Thus, in this example, the index 0x102 is masked to 0x100, to allow access to a pair of lines 576 at addresses 0x100 and 0x108 to handle cases when an X pattern spans two lines. The double register 568 is accessed based on the masked out portion of 0x102, which is 0x2. The double register 568 holds 16 bytes with a first byte location at 0x0 pointing to 0x9F and the last byte location at 0xF pointing to 0x00. The masked out portion 0x2 points to the first byte 0xBA of the Bx pattern 506. The rest of the access is guided by the MM. Similarly a pair of lines 578 containing the Y pattern 508 [0xFF58] is fetched from the Y memory 564 at address 0xA8 and loaded into the double line Y register 570. The mix mask 504 [0xFFC0FF80] is fetched from the multiple MM memory 566 at address 0x2 and loaded into the MM register 571. The X pattern 506 [0xBAC3E] is selected from the double line X register 568 based on the X index value of 0x102 and applied to the combiner 572. The Y pattern 508 [0xFF58] is selected from the double line Y register 570 based on the Y index value 0xA9 and applied to the combiner 572. The mix mask (MM) 574 [0xFFC0FF80] stored in MM register 571 is further applied to the combiner 572. The combiner 572 combines the appropriate bits from the X pattern 506 with the appropriate bits from the Y pattern 508 according to the MM 574 to produce the original instruction 502 that is stored in cache line 580 and passed to the execution pipeline 550. The other compressed instructions stored along with the XYM entry 554 in the double line X register and double line Y register, especially if using the same mix mask 574, may be decompressed in parallel with the decompression of the XYM entry 554 or in serial fashion depending on an instruction sequence. The format length of a decompressed variable length instruction is determined by the mix mask associated with the compressed instruction.

A characteristic of the placement of individual patterns within the X and Y memories shown in FIG. 5B and FIG. 5C is that the placement is unrestricted, and governed by a leftmost byte alignment. An acceptable, optimal, or near optimal placement with a high utilization of pad bits can potentially minimize or eliminate byte alignment fragmentation. Any restriction on symbol placement, such as a left adjusted alignment requirement, potentially produces fragmentation. For example, in byte aligned storage of randomly sized objects, a worst case scenario is 7-bits per stored symbol being wasted and carry no useful purpose other than the specific symbol placement guarantee. With the help of index compression in general, and usage of pad bits in particular, these 7-bits could be used for storing useful data. The upper bound of storage savings from wasted bit utilization is 7-bit times the number of symbols in the storage. Total savings from index compression in general is higher, and bounded by information entropy of the contents. There also could be symbols of different size occupying the same physical bits, and correctly extracted only in presence of appropriate MM which implicitly determines the length of the symbol. If a single MM is used, the X/Y dictionary symbol entries have the same size. If multiple mix masks are utilized, there could be as many variations in symbol sizes as there are MMs. For example, a variable length instruction format may include 32-bit formatted instructions and 64-bit formatted instructions. Nevertheless, the task of optimal placement of symbols is an NP complete problem and could not be expected to be perfectly solved in practice in reasonable linear time. To overcome this limitation, heuristics are used to produce near optimal placement in linear time, as described in more detail below with regard to FIGS. 12-14.

Figure 6:
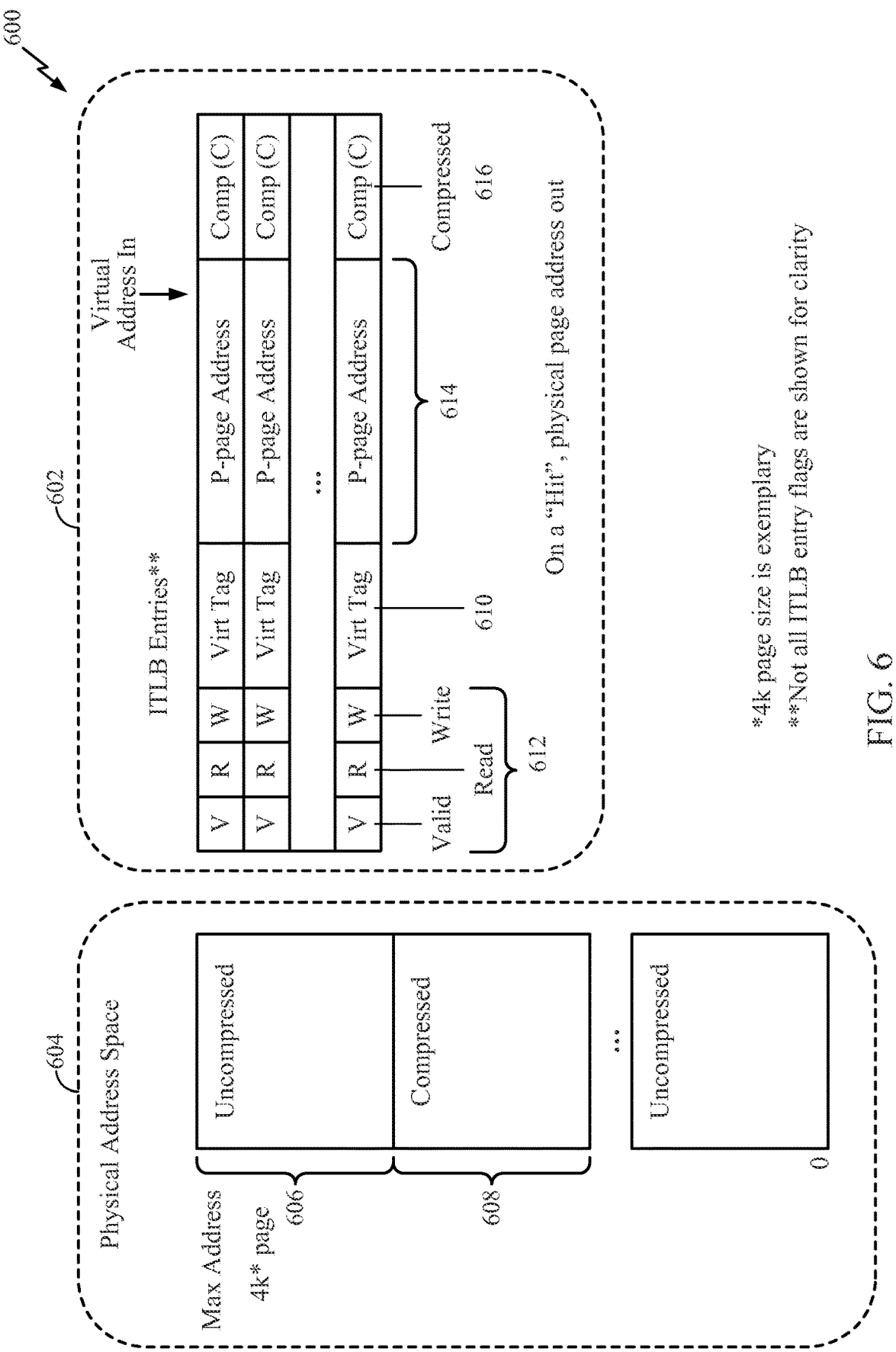
FIG. 6 illustrates a VLIW packet compression format in accordance with an embodiment of the invention.

Compressed instructions and uncompressed instructions may be mixed in the same executable code segment with no need for a mode switch in operation. In a paged virtual memory system, a page of memory may contain either compressed instructions or uncompressed instructions. FIG. 6 illustrates a paged virtual cache organization 600 having compressed pages and uncompressed pages in accordance with an embodiment of the invention. A virtual address is generally encoded in two parts. An upper field of address bits usually represent a virtual page number that is encoded based on a selected page size, such as 4K byte pages. A lower field of address bits is a page offset that identifies an address within the addressed page. In a virtual to physical address translation, the virtual page number is translated to a physical page number. The page offset is the same for both the virtual address and the physical address and is not translated.

A virtual to physical address translation system may include one or more translation look aside buffers (TLBs), such as instruction and data TLBs, to improve performance of a translation process. An instruction TLB (ITLB) is a small cache that stores recent virtual to physical address translations along with attributes of the stored pages, such as entry validation and access permissions. The ITLB generally includes a content addressable memory (CAM) circuit coupled with a random access memory (RAM) circuit and is relatively small, such as having 32 or 64 entries. Each ITLB entry includes a tag in the CAM circuit having the recently used virtual page numbers associated with translated physical page number in the RAM circuit. For example, the paged virtual cache organization 600 uses an ITLB 602 and a physical memory 604 having uncompressed pages 606 intermixed with compressed pages 608. Each entry of the ITLB 602 has a virtual address tag 610, entry flags 612, such as a valid (V) flag, a read (R) flag, a write (W) flag, a physical page (P-page) address 614, and a compressed (C) field 616. The C field 616 may be a single bit appropriate for identifying a page as compressed or uncompressed for a system having a single mix mask for all compressed pages, for example. Alternatively, the C field 616 may be two or more bits, which for a two bit field may indicate "00" not compressed, "01" compressed with a first mix mask, "10" compressed with a second mix mask, and "11" compressed with a third mix mask. The decision to compress or not to compress an instruction or a block of code is done statically at the compilation and code compression time and might depend on a variety of factors. For instance, if actual implementation of the system is sensitive in any way to the latency of decoding, then performance critical portions of an application might be kept in original uncompressed form, while less frequently executed code may be compressed. Determination of frequently versus infrequently executed code portions is done by the compiler and linker 206 with either optional profile directed feedback information 208 or with compile time heuristics based on the control structure of the code. However, placement of decoder 228 between L2 cache 224 and L1 Cache 232 effectively removes the decoder from performance critical paths of the system. Additional benefits from such placement of the decoder include not requiring changes to the execution pipeline 234 and potential power savings due to increased L2 capacity and thereby minimizing accesses to the main memory. These compression decisions are based on a close interaction of the translation tool 216 with the compiler and linker 206, and can take advantage of profile feedback information 208, which might identify legacy code not to be compressed and new function code to be compressed, for example.

Figure 7:
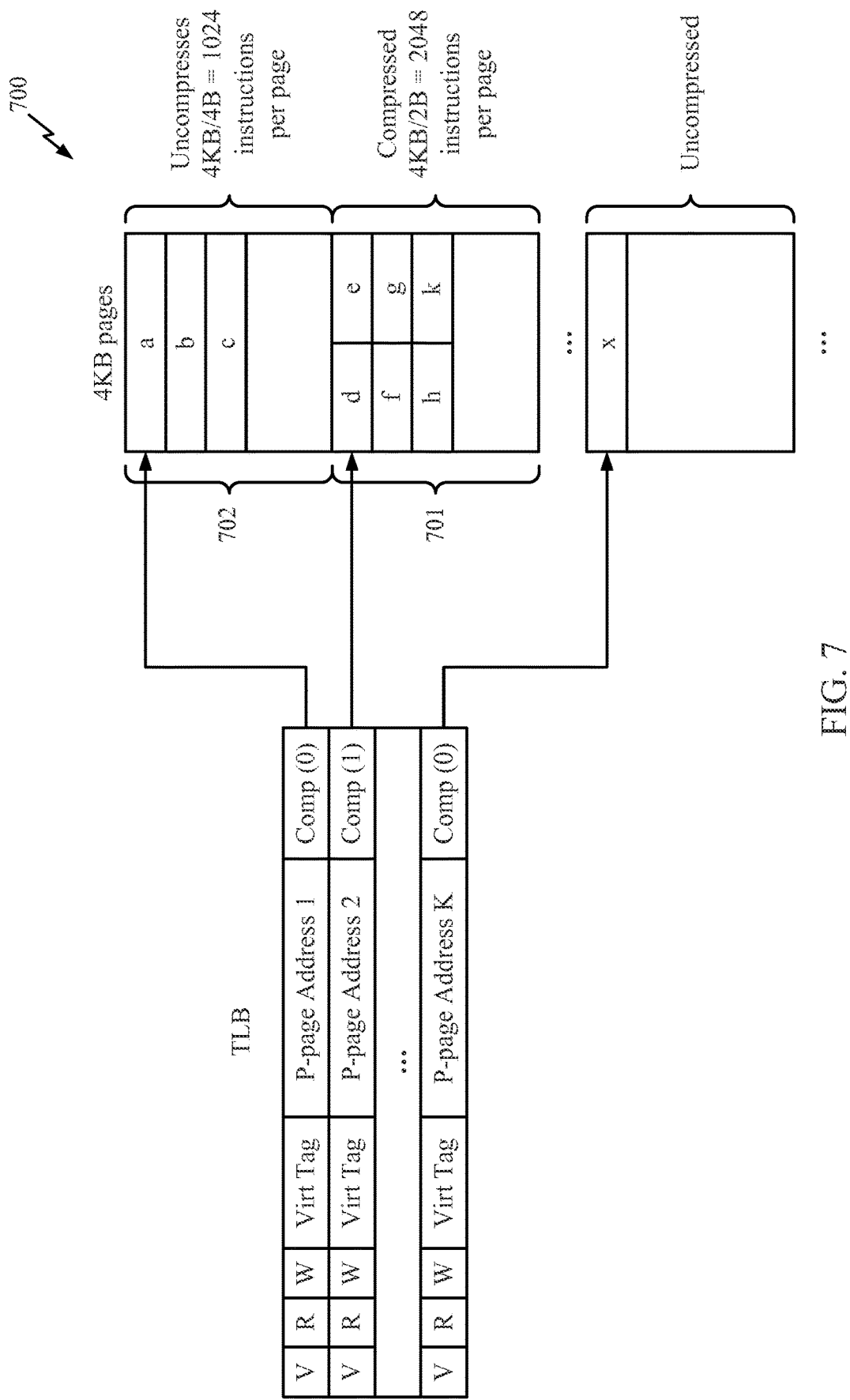
FIG. 7 illustrates a paged instruction translation look aside buffer (ITLB) and memory organization having compressed pages and uncompressed pages in accordance with an embodiment of the invention.

FIG. 7 illustrates a system 700 that mixes compressed and uncompressed code on a per physical memory page basis in a system similar to the paged virtual cache organization 600 of FIG. 6. The composition of a compressed page 701 and an uncompressed page 702 is shown for an example main memory physical address space having 4 Kilo-byte (4 KB) pages with 4 byte (4B) entries. Each page of compressed instructions and each page of uncompressed instructions are of the same capacity having the same fixed number of bytes. However, the number of instructions stored in the compressed page 701 is double the number of instructions stored in the uncompressed page 702, using, for example, a compressed instruction format that is half the number of bits used in the uncompressed instruction format. For example, the compressed page 701 stores compressed instruction d,e,f,g etc. as a pair of X/Y indexes in 16 bits or 2 Bytes. Thus, the compressed page 701 which is a 4K page contains 2048 instructions, while the uncompressed page 702 contains only 1024 instructions. Since the page boundaries are not affected by whether a page holds compressed instructions or holds uncompressed instructions, the address translation for physical location of a page is unchanged, but compressed page holds more individual instructions.

Figure 8A:
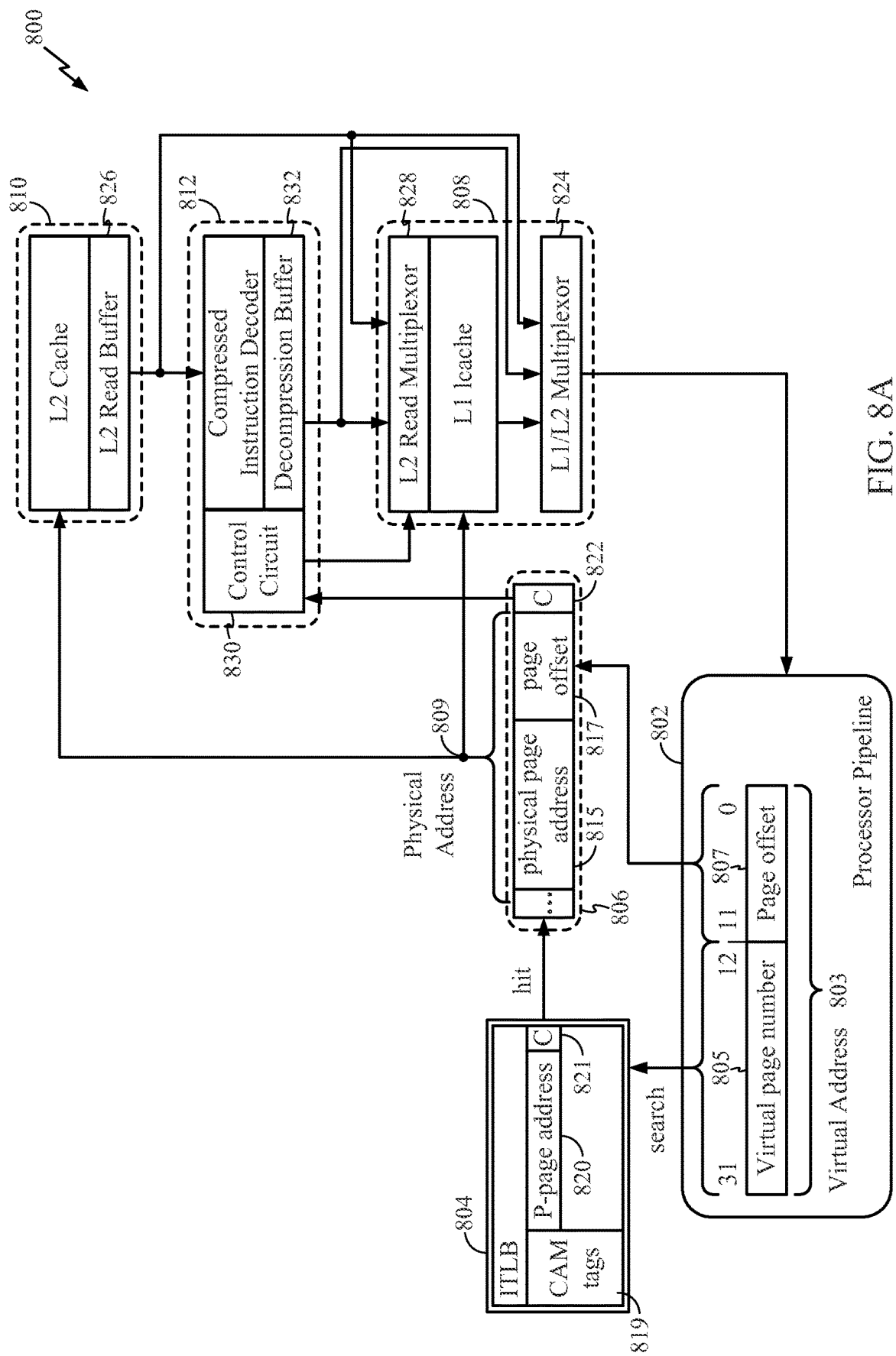
FIG. 8A illustrates a paged decompressor system for decompressing compressed instruction pages and accessing uncompressed instruction pages in accordance with an embodiment of the invention.

FIG. 8A illustrates a paged decompressor system 800 for decompressing compressed instruction pages and accessing uncompressed instruction pages in accordance with an embodiment of the invention. The paged decompressor system 800 is comprised of a processor pipeline 802, an ITLB 804, a physical address buffer 806, an L1 Icache 808, an L2 cache circuit 810, and a compressed instruction decoder circuit 812. A translation process begins by applying a virtual page number 805 selected from a virtual address 803 to the CAM circuit which does a parallel comparison of the applied virtual page number generally with all of the stored recently used virtual page numbers stored with the entry tags in the CAM tags 819. If there is a match, the CAM circuit accesses a corresponding entry 820 in the RAM circuit which is output as a translated physical page address 815 stored in the physical address buffer 806. A translated physical address 809 comprises the translated physical page address 815 concatenated with the page offset 817 from the virtual address 803.

For example, in an embedded system with a virtual address space of 4 gigabytes (4 GB) and 4K byte pages, a virtual address 803 is comprised of a virtual page number 805 having bits [31:12] and a page offset 807 having bits [11:0]. In the same embedded system, the memory hierarchy of caches and main memory may encompass a physical memory space of 512K bytes and 4K byte pages. On a hit in the ITLB 804 the virtual address 803 is translated to a physical address 809. The physical address 809 is comprised of a physical page number 815 having bits [28:12] and a page offset 817 having bits [11:0]. In such a system, the virtual to physical translation system would translate a virtual page number 805 encoded in bits [31:12] to a physical page number 815 encoded in bits [28:12]. Also, on the hit the compressed bit field 821 is also output to be stored in the physical address buffer 806 as C bit field 822. The placement of the compressed bit field 821 and the C bit field 822 is exemplary.

The physical address 809 is used to search the L1 Icache 808 for a matching entry. If a matching entry is found, it is a decompressed instruction that is associated with the matching entry and is selected to pass through the L1/L2 multiplexor 824 to the processor pipeline 802. On a miss in the L1 Icache 808, the physical address is directed to the L2 cache 810 to search for a matching entry. On a hit in the L2 cache 810, a line of instructions having the associated matching entry is fetched and stored in a L2 read buffer 826. If the C bit field 822 indicates uncompressed instructions, the instructions in the L2 read buffer bypass the compressed instruction decoder 812 and are made available at the L2 read multiplexer 828 for storage in the L1 Icache 808 and to be selected to pass through the L1/L2 multiplexor 824 to the processor pipeline 802.

If the C bit field 822 indicates compressed instructions, the instructions in the L2 read buffer 826 are decompressed in the compressed instruction decoder 812 based on the C bit field 822 indicating compressed instructions to the control circuit 830. The decompression process is described in more detail below with regard to FIG. 8B. The decompressed instructions are stored in decompression buffer 832 which may be selected by the L2 read multiplexor 828 for storage in the L1 Icache 808 and selected to pass through the L1/L2 multiplexor 824 to the processor pipeline 802.

As was illustrated earlier in FIG. 5C, compression of a native application may specify usage of multiple mix masks. If desired granularity is down to a single instruction, as it is suggested in the FIG. 5C, each X/Y index pair must have a way to select appropriate mask. If a mix mask is selectable on an instruction by instruction basis, identification of the mix mask requires additional storage bits, such as the 2-bit mix mask index shown for example in XYN entry 554. Another approach allows a mix mask to be selected per code page, which removes the need for a mix mask marker from an X/Y index pair 554 and places the mix mask marker in a TLB page descriptor as part of the C field, for example.

Figure 8B:
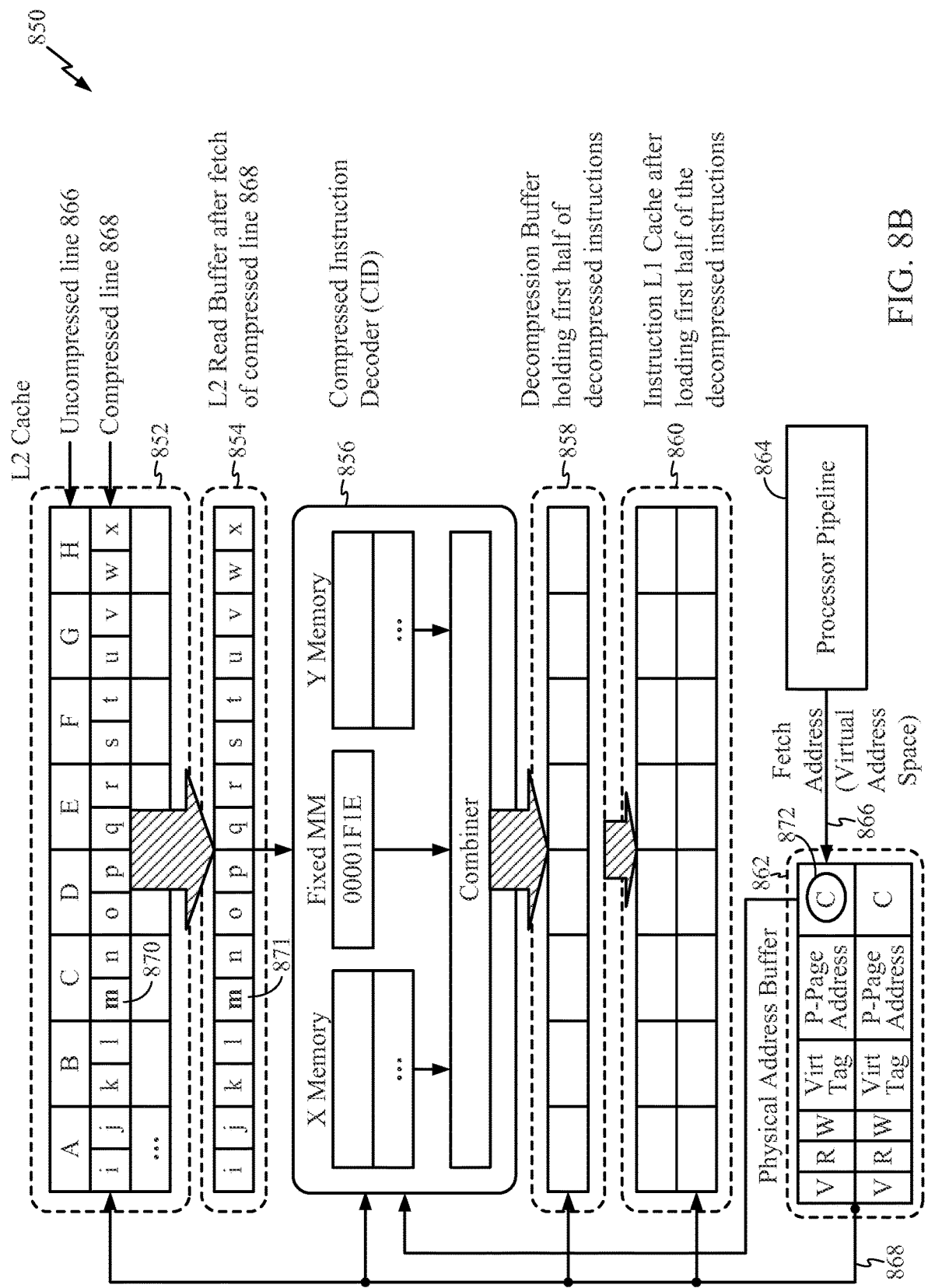
FIGS. 8B and 8C illustrates exemplary decompression state diagrams that illustrate the state of L2 cache compressed page instructions and L1 Icache decompressed instructions for execution on processor pipeline in accordance with an embodiment of the invention.

FIG. 8B illustrates an exemplary decompression state diagram 850 that illustrates a first state of L2 cache compressed page instructions and L1 Icache decompressed instructions for execution on processor pipeline. FIG. 8B shows an L2 cache 852, a L2 read buffer 854, a compressed instruction decoder (CID) 856, a decompression buffer 858, an L1 Icache 860, a physical address buffer 862, and a processor pipeline 864. The L2 cache 852 has an uncompressed line 866 and a compressed line 868 as an initial state. The uncompressed instructions are 32-bit native instructions and each of the compressed instructions are 16-bits made up of an X-index and a Y-index pair, as described above, for example, with respect to FIG. 4. The compressed line 868 holding twice as many instructions as the uncompressed line 866. A fetch for an instruction M is made by the processor pipeline 864 which is translated from a virtual address to a physical address by a ITLB, such as the ITLB 804 of FIG. 8A, and stored in the physical address buffer 862. Initially, the L1 Icache 860 does not contain the instruction M and a miss is generated which causes a fetch to upper levels of the memory hierarchy. The decompression buffer 858 is checked first which in this exemplary scenario, the instruction M is not found.

Figure 8C:
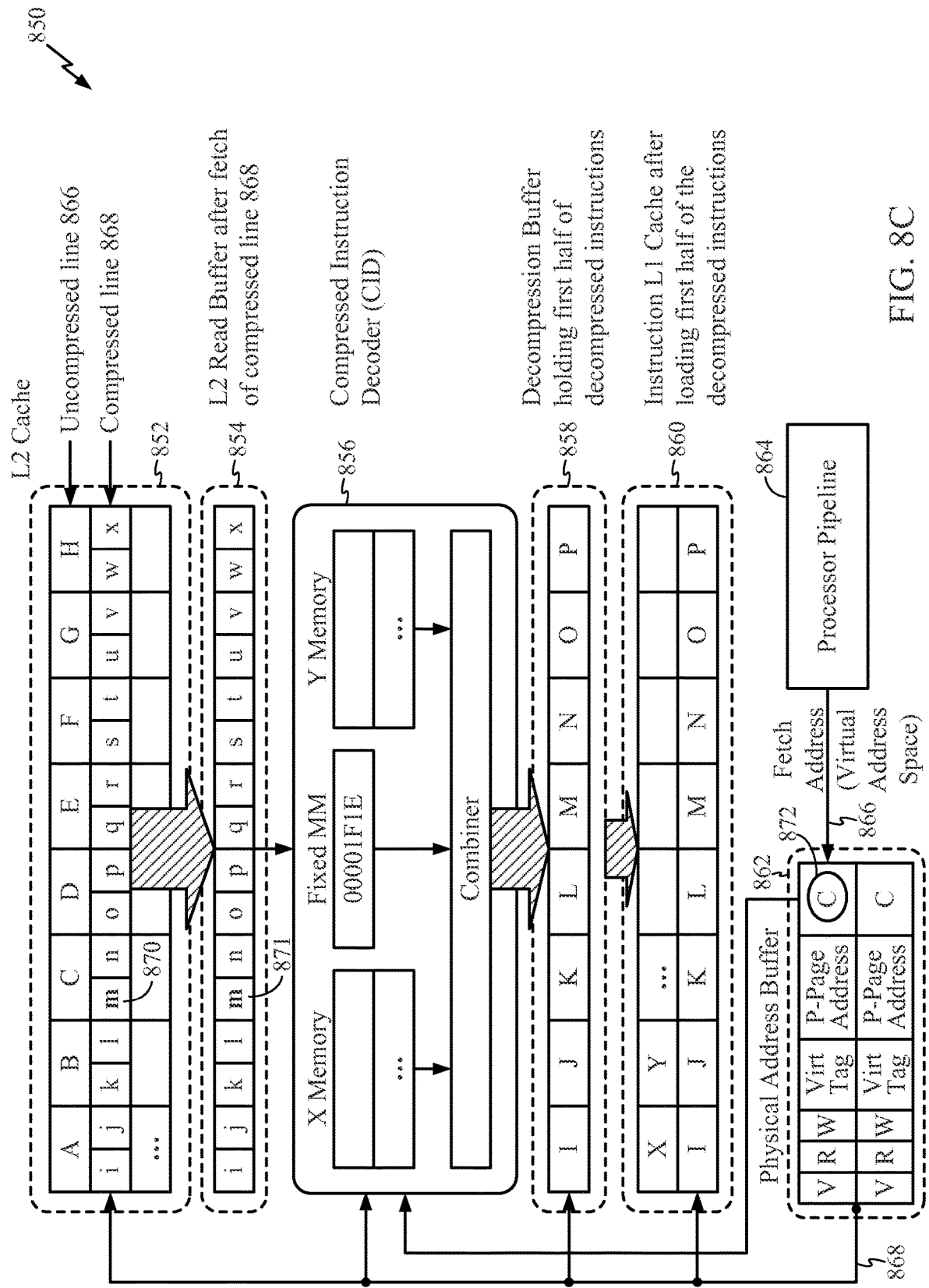

FIG. 8C illustrates an exemplary decompression state diagram 850 that illustrates a second state of L2 cache compressed page instructions and L1 Icache decompressed instructions for execution on processor pipeline. The L2 cache 852 is checked next and the compressed line 868 is found to contain the instruction M, in a compressed form "m" 870. The compressed line 868 is fetched and stored in the L2 read buffer 854. The CID 856 receiving the C bit field 872 and the fetch address allowing the compressed instructions from the L2 read buffer 854 to be fetched sequentially beginning from the compressed instruction "m" 871. Note, a first instruction in a fetch sequence may be accessed, decompressed first and quickly forwarded to the processor execution pipeline to minimize timing requirements. Since the compressed instructions as described herein have fixed length and known storage address locations prior to decompression, a first compressed instruction in a fetched sequence may be identified in a line of compressed instructions. Since the L1 Icache has a line length of eight uncompressed instructions, the compressed instructions are accessed from the L2 read buffer 854 in a L1 Icache line length, starting from "m, n, o, p, then i, j, k, and l". The second half of the L2 read buffer 854 is accessed next starting from "q, r, s, t, u, v, w, and x". Thus, the compressed instructions are accessed from an arbitrary starting point in the L2 read buffer 854.

Since the instruction M is fetched first, it is decompressed first in the CID 856 and then may be forwarded to the processor pipeline 864. As the other instructions "n, o, p, then i, j, k, and l" are decompressed they are combined with the decompressed instruction M and loaded in the decompression buffer 858. Once a full line of instructions have been decompressed they are loaded into the L1 Icache 860. Alternatively, individual decompressed instructions or pairs of decompressed instructions, for example, may be individually updated in the L1 Icache 860 and forwarded as needed to the processor pipeline 864. It is noted that if the decompressed instruction line stored in the decompression buffer 858 is duplicated in the L1 Icache 860, the decompression buffer, holding the decompressed instruction line, may be used as a victim cache temporarily storing the last instruction block evicted from L1.

The determination of the X-index, Y-index, X pattern, Y pattern, and one or more mix masks depends on the native instruction architecture and the use of instructions in a particular code segment. When analyzing a code segment, a single mix mask may provide comparable compression to that obtained through use of multiple mix masks. The use of a single mix mask could be seen as using a single instruction group and effectively separating the native instructions used in a code segment into two parts, the X patterns and the Y patterns. Also, use of a single mix mask simplifies the design of a combiner circuit, such as the combiner 418 of FIG. 4. For example, in an experimental code segment having 16,542 native 32-bit instructions to implement a particular function, there were only 6,464 unique instructions and overall entropy of 0.76 indicating the experimental code segment has excess capacity to represent the function and could be compressed. Using a single mix mask, these 6,464 instructions were split into 1,351 X patterns and 1,345 Y patterns. Using the techniques of an embodiment of the invention, each of the 16,542 native 32-bit instructions is replaced by a 23-bit X/Y-index pair, providing a 28.1% compression in the storage capacity of the L2 cache and main memory in a system such as shown in FIG. 2. Resulting entropy of the encoded data increased from 0.76 to 0.89. However, the 0.89 entropy measurement out of a theoretically possible 1.0 informational entropy measure, illustrates that a different mix mask may provide better results.

The creation of a mix mask may use one or more different heuristic processes. In these different heuristic processes, P_unique instructions are generally sorted into groups according to a current grouping heuristic for the selected MM based on having a single MM or multiple MMs for the code segment. For example, grouping for single MM is a process of separating the unique instructions into X and Y portions, such as the exemplary elements 500 of FIG. 5A, and constructing initial uncompressed X and Y tables. In one example, the whole native instruction program could be viewed as a single group. On the other hand, grouping for multiple MMs involves partitioning the unique instructions into several groups with a unique MM for each group. In this case, an X pattern represents a fixed pattern for a group, where the whole group shares the single fixed X pattern, and the multiple Y patterns per group represent the mutable part of the group. While several heuristics are possible for near optimal partition into groups, selection of one specific heuristic could be driven by another heuristic which may be based on the size of the input list of unique instructions and its initial entropy. Some heuristics have proven through experimentation to be practical, including a genetic process, a Hamming process, a weighted Hamming process, a number of ones process, and a weighted number of ones process.

FIGS. 9A-9F illustrates genetic process 900 for determining a mix mask in accordance with an embodiment of the invention. A translation tool, such as the translation tool 216 of FIG. 2 implements the genetic process 900. The genetic process 900 is initialized at block 902 before starting the process 900 to group P unique instructions and select a mix mask. At block 904, the code segment P to be compacted is obtained. For example, the code segment P may include boot code, operating system code, and multiple function programs as utilized in a particular product. At block 906, the unique instructions in the code segment P are collected in a P hash table (P_unique). At block 908, the P_unique instructions are sorted in a semantic order, such as an ascending bit pattern order, based on the instruction formats. For example, each instruction in the P hash table is interpreted as an integer number using 32-bits and is sorted in ascending order in a list. This guarantees the smallest Hamming distance between neighboring instructions and enables instruction grouping in later steps. At block 910, a bit switch frequency is collected in sorted order of unique instructions. For example, if a bit in position p changes from "1" to "0"

or "0" to "1", a bit_toggle [p] value is incremented by one. A bit_toggle array is equal to a count for each bit position p in the width of the largest instruction in the original ISA expressed, for example as 32 bit_toggle[p] count values for a 32-bit instruction set architecture. At block 912, a set of seed mix masks, the seed MM population, is selected using several known good MMs, several randomly generated MMs, and several MMs generated from the collected bit toggle counts. The known good masks are pre-populated from previously obtained MMs from similar applications and are specific to any given architecture. The collected bit toggle count serves as a good heuristic in estimating likelihood of a bit changing its value in the given position in the actual code. Empirically, selecting a mix mask as a function of a threshold for the bit_toggle[p] count values across the bit positions p produces a good seed mask. For example, the seed MM population is an array of between 10 and 30 individual MMs of and may be selected as an even number of individual MMs. A larger population can produce better results, but a linear increase in the number of MMs chosen requires a corresponding increase in computation time. At block 912, a particular seed MM population is selected to fit a specific computational platform. A seed population value of 20 MMs has been shown to be a good tradeoff in an experimental setup. At block 914, a fitness value for each selected MM in the seed MM population is set, for example, to a low but non-zero value. The fitness value is, for example, a double precision floating point number representing the level of benefit a MM provides. The process 900 proceeds to connector A 916 which is a link to connector A 916 in FIG. 9B.

Figure 9A:
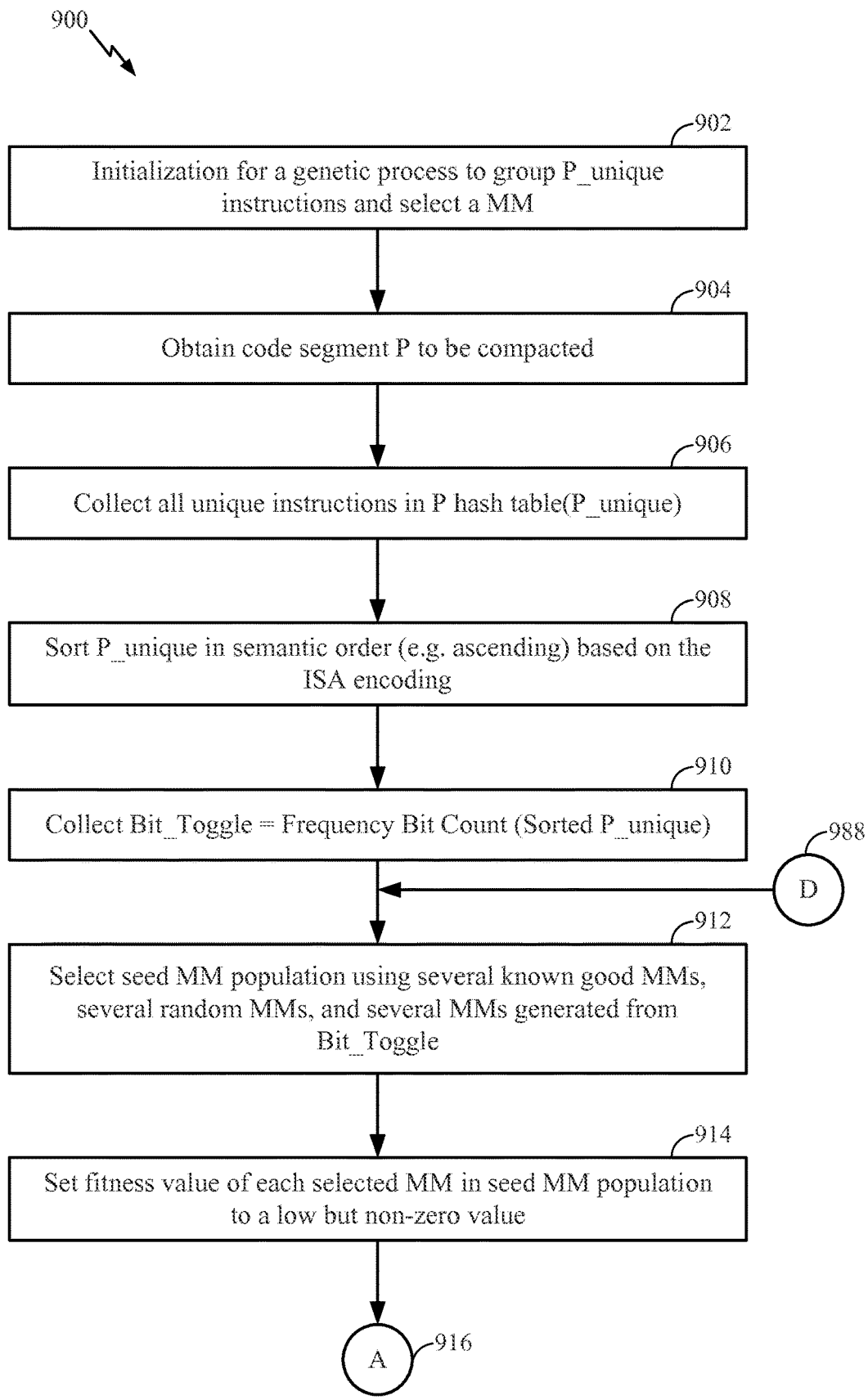
FIGS. 9A, 9B, 9E and 9F illustrate a genetic process for determining a mix mask in accordance with an embodiment of the invention.
Figure 9B:
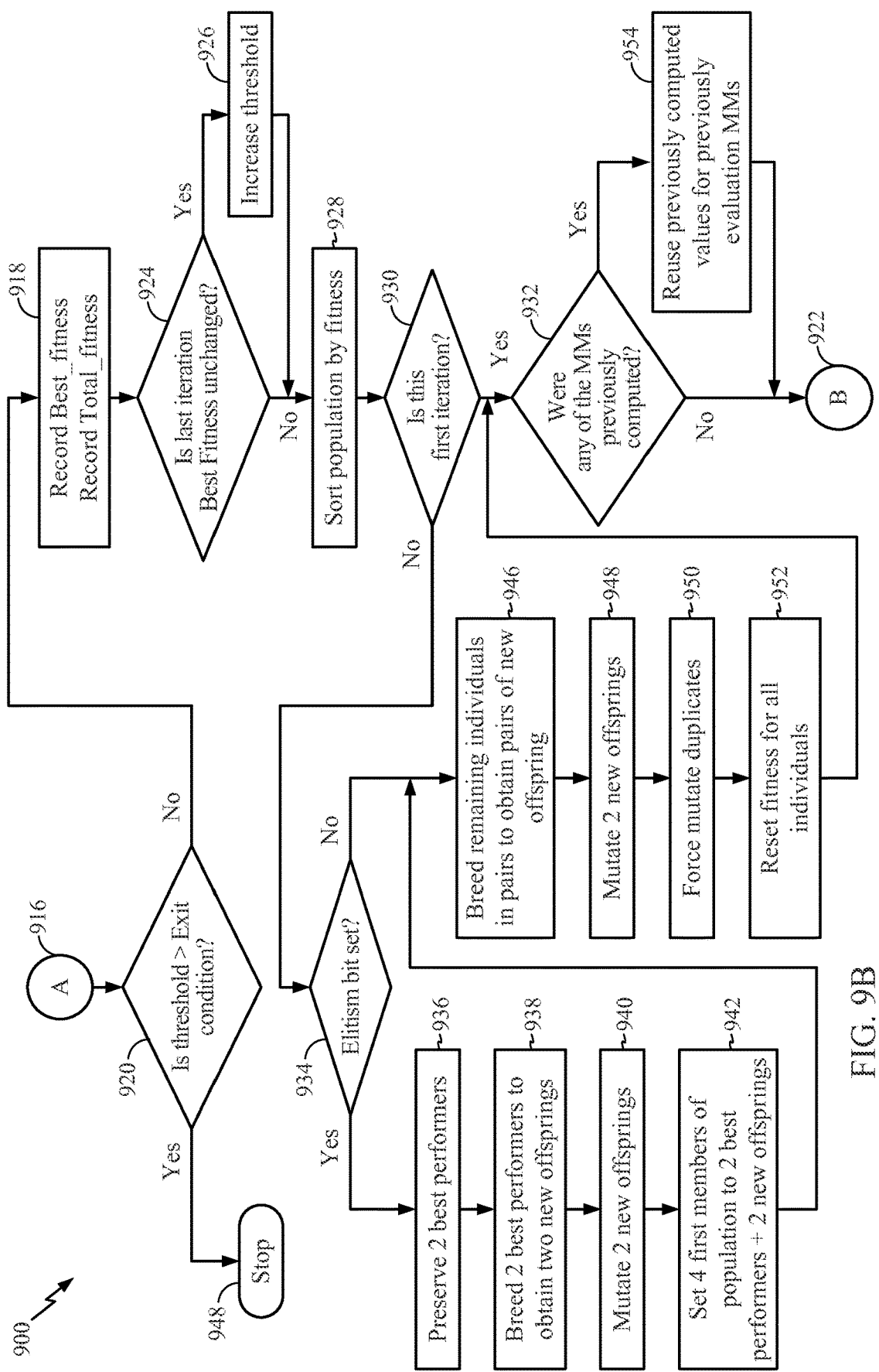

In FIG. 9B the repetitive part of the process 900 is contained. A seed population of MMs is provided as input to the process 900. At the decision block 920, a determination is made whether another iteration will take place. A threshold value is compared to a numerical exit condition and if the exit condition is not reached, as would be the case when the threshold is less than or equal to the exit condition, another iteration is commenced.

At block 918, an individual having the best fitness value is determined to be the best individual, and its fitness value (cost function) is recorded. Also, the value of total_fitness determined as a sum of cost functions of the individuals in the population is obtained from process 972 FIG. 9E, as described in more detail below and recorded. The total_fitness value is later used as a parameter to a mutation algorithm causing a higher rate of mutation if overall compression effectiveness is low based on an assumption that a faster rate of change is desirable. At decision block 924, a determination is made about progress of completing the process 900. If the last iteration best fitness value was unchanged from the previous iteration, the process 900 proceeds to block 926. At block 926, the threshold value is increased. If the last iteration best fitness value is different from the previous iteration's best fitness value, the process 900 proceeds to block 928. At block 928, the population is sorted by the fitness values. At decision block 930, a determination is made whether the process 900 beginning with the decision block 920 is on a first iteration. If it is determined to be the first iteration, the process 900 proceeds to block 932. Otherwise the process 900 with a current population of MMs proceeds to blocks 934-952 for creating a new population.

At decision block 934, a determination is made whether an elitism indicator is set. The elitism indicator indicates whether a plurality of best in class MM are to be preserved. If the elitism indicator is set, the process 900 proceeds to block 936. At block 936, two best performer MMs from the previous iteration are directly copied into the new population. At block 938, two offspring MMs are produced from the two best performers as described in more detail below with regard to FIG. 9C. At block 940, the two offspring MMs are randomly mutated to create two mutated offspring MMs as described in more detail below with regard to FIG. 9D. At block 942, the first four members of the current population are replaced by the two best performer MMs and the two mutated offspring MMs. The process 900 then proceeds to block 946.

Returning to decision block 934, if the elitism indicator was not set indicating elitism is not elected, the process 900 proceeds to block 946. At blocks 946 and 948, a similar procedure of interbreeding as described at block 938 and mutation as described at block 940 is repeated for unprocessed pairs of remaining individual MMs from the previous iteration population. At block 946, a partner selection algorithm is used to select random individuals, with a chance of selection proportional to the fitness of the individual. The better performing individuals are more likely, but not guaranteed, to produce offsprings. At the end of block 948, new iteration population is determined. At block 950, any duplicates in the new iteration population are mutated to insure that there are no duplicates in the new iteration population. At block 952, fitness values for individual MMs in the new iteration population are reset. At this point, the new iteration population is ready for a cost calculation. In order to save computation time, a list of previously computed costs for previously processed MM (individuals) is maintained. At block 932, the new iteration population is compared with a list of previously processed MM individuals. If none of the new iteration population has been previously computed, the process proceeds to connector B 922 on FIG. 9E. If any of the new iteration population has been previously computed, an already determined cost is pre-populated at block 954. The process 900 then proceeds to connector B 922 on FIG. 9E.

Figure 9C:
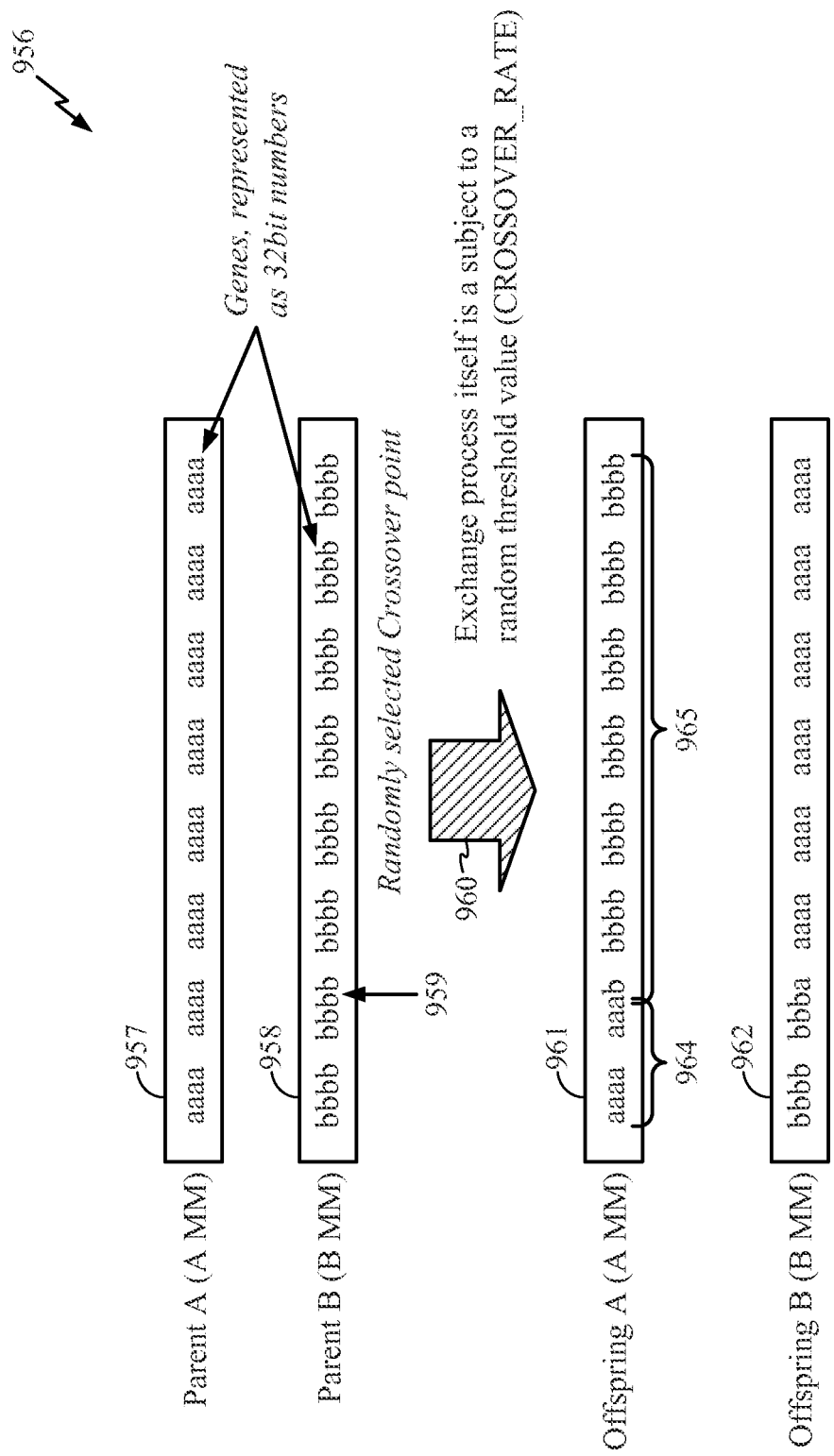
FIG. 9C illustrates implementation of crossover algorithm in accordance with an embodiment of the invention.

FIG. 9C illustrates an exemplary breeding process 956 such as employed at block 938 in reference to FIG. 9B. The two best performer MMs are chosen as parent A 957 and parent B 958, where the mix mask (MM) is represented by a 32-bit number and for the purpose of this step the MM is denoted a gene. For the breeding process 956 of FIG. 9C implemented at block 946, two individual MMs are selected from the input MM population and may also be represented as parent A 957 and parent B 958. At blocks 938 and 946, the two parents are breed as shown in FIG. 9C via an exchanging genes process 960 at a randomly selected crossover point 959 in the gene at a random frequency of selection, specified by a crossover_rate parameter, producing two offsprings A 961 and B 962. A random selection may be guided by a pseudo-random number generator and may be termed a semi-random selection. One parent, parent A 957, provides a beginning portion 964 of one offspring's, offspring A 961, new gene and the other parent, parent B 958, provides a tail portion 965 of that offspring's gene. The other offspring B 962 is a complement of the first one. The parent B 958 which produces the tail portion 965 for the offspring A 961 produces a beginning portion for offspring B 962. The parent A 957 which produces the beginning portion 964 for the offspring A 961 produces a tail portion for offspring B 962. The crossover point 959 is selected randomly in the range of 0-32 which implies that in some cases no exchange takes place. A mutation process is described in more detail below. The breeding process 956 illustrated in FIG. 9C is itself a pseudo-random event and subject to a parameter. For example, out of 100 attempts to exchange genes between two parents, only a crossover_rate times the number of breeding exchange attempts will even take place. If a cross over exchange did not happen, offsprings are still produced that fully inherit the parent's genes, such that these offspring are exact copies of their parents.

Figure 9D:
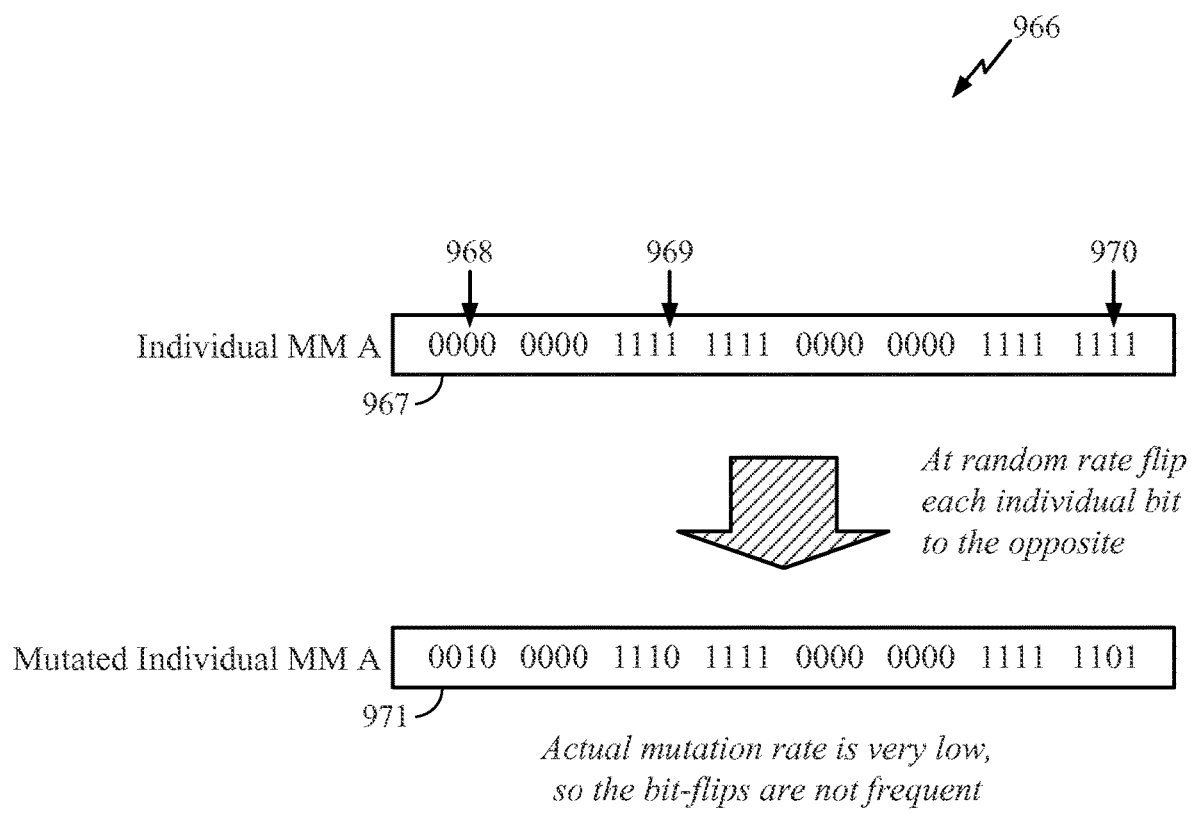
FIG. 9D illustrates an implementation of mutation algorithm in accordance with an embodiment of the invention.

In reference to blocks 940 and 948 of FIG. 9B, the newly generated offspring MM population is mutated by semi-randomly flipping individual bits, changing a "0" to a "1" or a "1" to a "0", in each offspring gene. This mutation process 966 is illustrated in FIG. 9D where an individual MM A 967 is mutated by bit flips associated with bits, 968, 969, and 970. The mutated individual MM A 971 shows the results of the bit flips. In the mutation process 966, a pseudo-random mutation acts to introduce previously unavailable traits into the MM population. For example new previously untried MMs are created, but at a controllable rate, so that undesired mutations may be pruned out quickly.

Figure 9E:
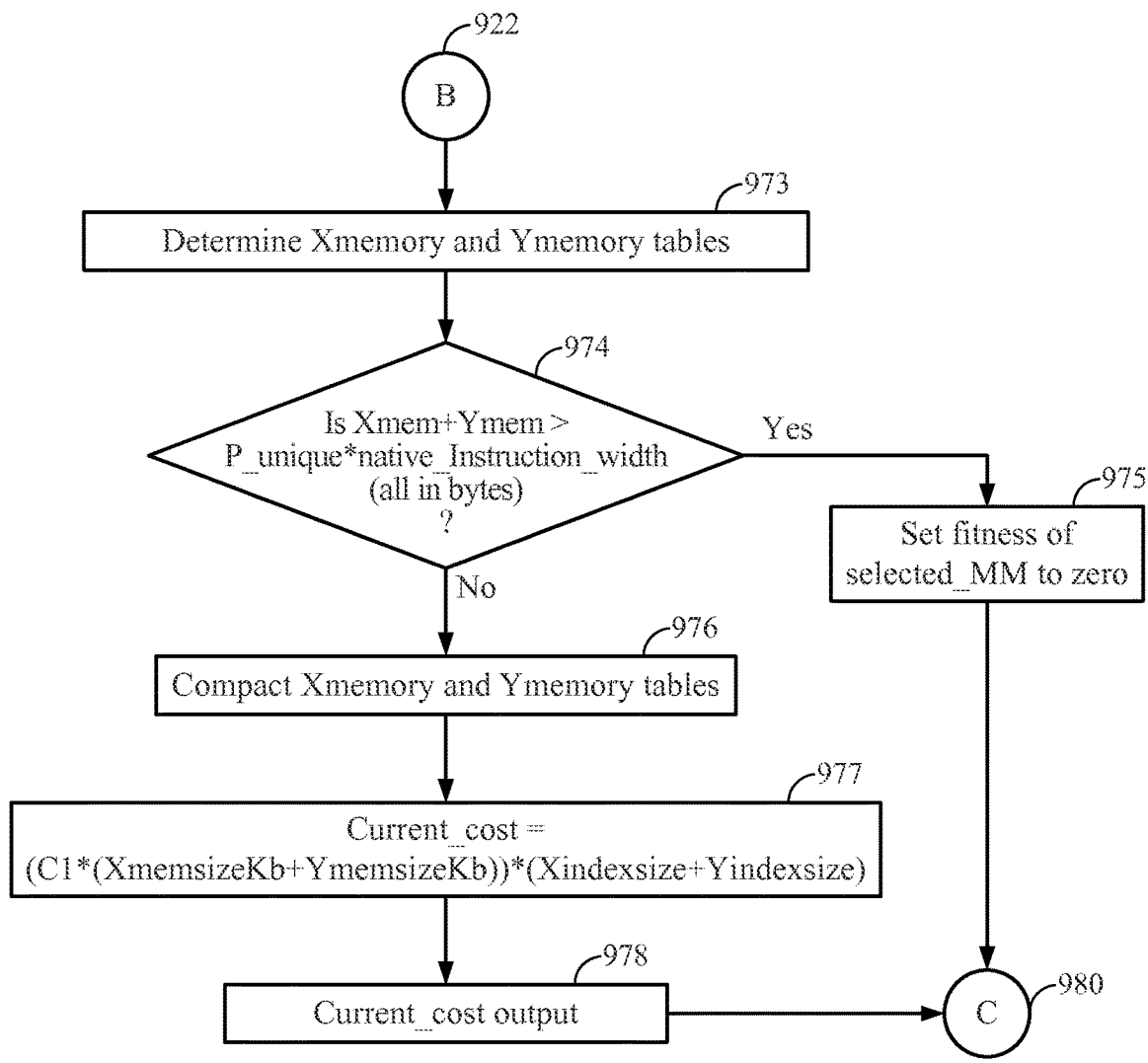

FIG. 9E illustrates an exemplary dynamic compression and current cost calculation process 972 in accordance with an embodiment of the invention. The current cost calculation process 972 comprises calculating a current individual MM's cost function as a dynamic compression function of the selected MM and the sorted P_unique list. The cost function is comprised of two main components: the size of external storage and the size of translation dictionary. These two components combined reflect an obtained degree of compression or an achieved level of entropy. The exact relationship of external storage size to internal X/Y memory decompression table size is determined by a parameter indicating a relative importance of the two components. For example, the cost function equals a product of sum x and y index size times X/Y dictionary size in Kbytes. So cost is equal to the X/Y_dictionary_size*(x_index_size+y_index_size). This formula reflects a balanced approach to evaluating the relative importance of internal dictionary size versus external storage size. A preference may be introduced in the cost function by introduction of relative importance weight constants. For example, cost is equal to (weight_constant*X/Y_dictionary_size)*(x_index_size+y_index_size). In a current implementation, the weight_constant is set to 1.00, though it may vary in other embodiments, for example and not by way of limitation from 0.01 to 1.00.

At block 973, X memory and Y memory tables, such as the X patterns stored in the X memory 412 of FIG. 4 and the Y patterns stored in the Y memory 414, respectively, are determined as described above with regard to FIG. 4. At decision block 974, a filtering heuristic is used to filter out substandard MMs, which represent unfit individuals. A mix mask is determined to be clearly unfit if the unpacked X/Y table generated from it exceeds in byte size the input raw instruction list size. Thus, at decision block 974, a determination is made whether the X memory size+Y memory size is greater than the number of P_unique instructions times the native instruction width, which in this exemplary case is 32-bits. If the determination is positive, the process 972 proceeds to block 975 to reject the substandard mix mask. At block 975, the fitness value for the substandard MM rejected is set to zero and the process 972 proceeds to connector C 980 on FIG. 9F for the genetic process 900. If at decision block 974 the determination is negative, the process 972 proceeds to block 976.

At block 976, the X memory and Y memory tables are compacted thereby reducing the X memory size and reducing the Y memory size. Block 976 directly affects the size of the X and Y tables which in turn determines the size of indexes needed to address these tables and ultimately determines the size of the external compressed code segment. The X and Y tables are compacted using indexing compression as described with regard to FIG. 5B and FIGS. 12-14 described in more detail below. At block 977, a current cost is generated as equal to a constant C1 times a sum of the X memory size plus Y memory size which is then multiplied by the sum of the X index size plus the Y index size. This process 972 computes an entropy value which is represented by the current cost that is close to the actual entropy of the compressed code which is now separated into a collection of X/Y indexes and the X/Y compacted tables. Optionally at block 977, a theoretical minimum entropy measure may be calculated and used to determine whether a further search for a better mix mask is needed or not. At block 978, the generated current cost is made available to the genetic process 900 which then proceeds to connector C 980 in FIG. 9F.

Figure 9F:
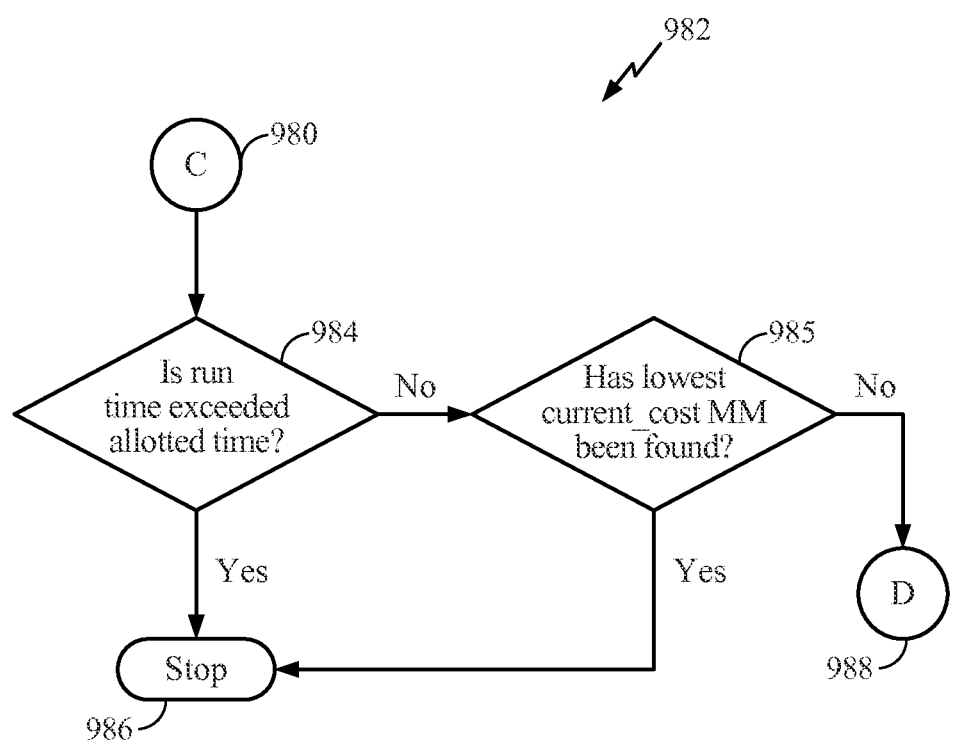

In FIG. 9F a decision process 982 is followed to determine whether to continue or stop the search in accordance with an embodiment of the invention. At decision block 984, a determination is made whether the run time for the genetic process 900 has exceeded an allotted time. If the run time has exceeded the allotted time, the genetic process 900 proceeds to block 986 and stops. If the run time has not exceeded the allotted time, the genetic process 900 proceeds to decision block 985. At decision block 985, a determination is made whether a lowest current cost MM has been found. For example, finding only a single MM that generates a current cost less than the threshold may be insufficient reasons to terminate the genetic process 900. On the other hand, it is possible to detect that a theoretical lowest entropy bound representation has already been reached and any further search is unnecessary. In another example, a number of MMs may be found, each generating approximately the same current cost that is less than a cost threshold which also may be sufficient reason to terminate the genetic process 900 at block 986 with selecting the MM with the lowest current cost or selecting one of a plurality of MMs each with the same acceptable lowest current cost. Otherwise at block 985, the genetic process 900 proceeds to connector D 988 of FIG. 9A for the genetic process to continue the search.

Figure 10:
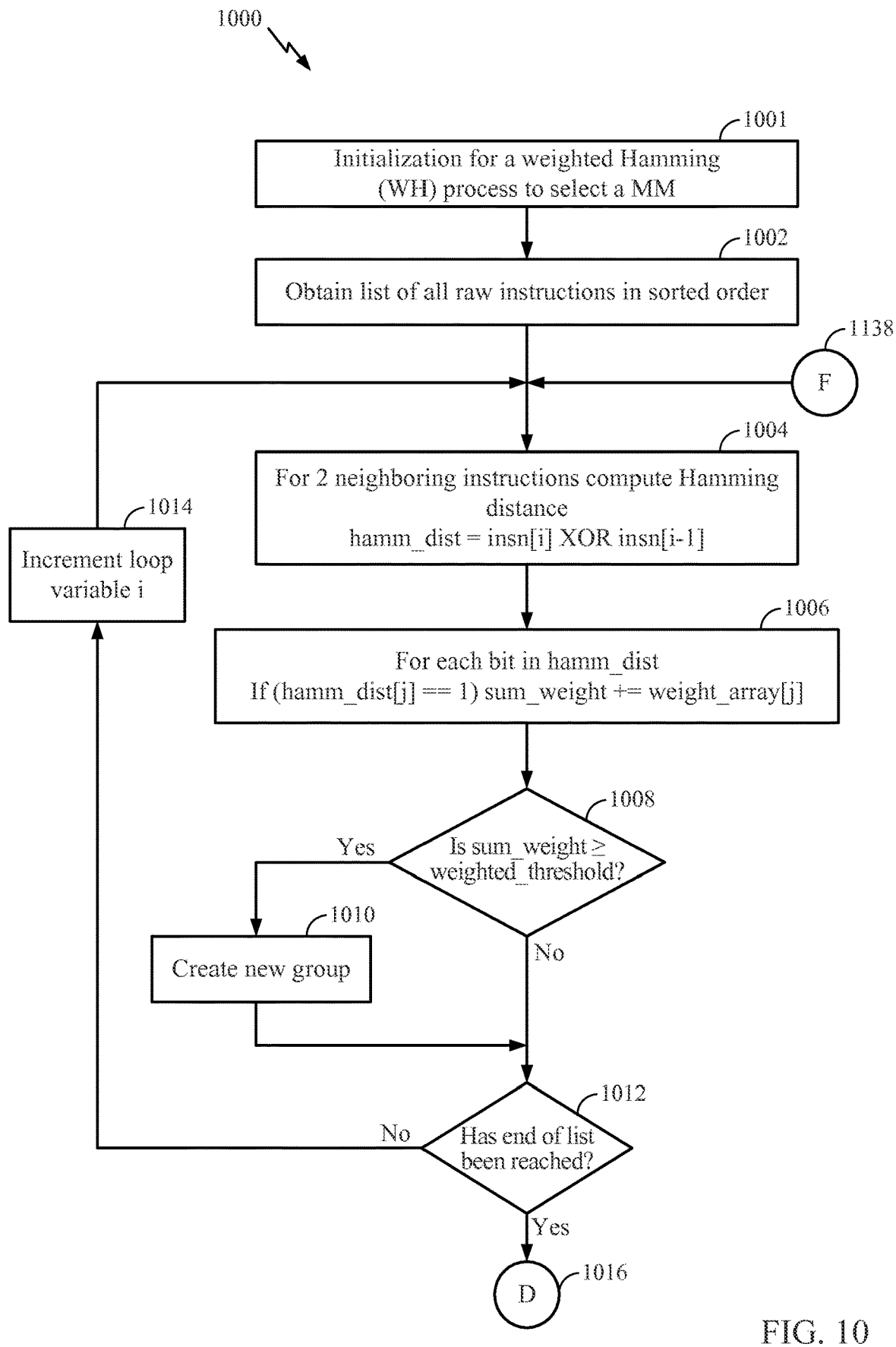
FIG. 10 illustrates a weighted Hamming process used to select a mix mask in accordance with an embodiment of the invention.

Another process to determine a mix mask is illustrated in FIG. 10. FIG. 10 illustrates a weighted Hamming (WH) process 1000 that is used to select a mix mask (MM) in accordance with an embodiment of the invention. Heuristics such as the number of ones heuristic and the weighted number of ones heuristics are based on measuring mutability of a bit field in an instruction. For example, a lower number of ones in a MM indicates a larger X pattern and fewer Y patterns per group. A higher number of ones in a MM indicates a smaller X pattern and more Y patterns per group. There exists a non linear dependency generally with a single point for selection of the number of ones in a mix mask that produces the highest compression. The weighted Hamming process 1000 assigns certain bit fields positions more weight than others in computing a change score that is compared to a threshold, to select a mix mask as shown in FIG. 10.

The WH process 1000 is initialized at block 1001 before starting the process 1000 to select a mix mask. At block 1002, a full list of sorted input raw instruction patterns is obtained (sorted P_unique). At block 1004, two neighboring entries are processed at a time by analyzing hamming distance between them. A variable hamming distance value (hamm_dist) is calculated as an XOR of the two neighboring entries. For example, if list of raw instructions contains only three entries 0, 1 and 2, the hamm_dist value is calculated twice—first as XOR between entries 0 and 1, then between entries 1 and 2. At block 1006, the hamm_dist values are parsed one bit at a time and a sum_weight value is incremented for each non-zero bit. Block 1006 could be seen as counting non zero bits in each hamm_dist value. The increment amount may be changed by bit position. An exact increment amount is read from a weight_array which is in turn calculated from the Bit_Toggle array computed in block 910 of FIG. 9A if the genetic process 900 is also run or pre-calculated statically. At decision block 1008, a determination is made whether the sum_weight value exceeds a weight_threshold. A positive outcome indicates a new instruction group is to be formed when a specified threshold in hamming distance is exceeded between neighboring entries in the sorted unique instruction list. At block 1010, the new group is formed and a "1" is assigned in a mix mask for bit locations with a change in frequency above the threshold and a "0" otherwise. A negative output of decision block 1008 causes the process 1000 to proceed to the decision block 1012. At decision block 1012, a determination is made whether the end of the sorted P_unique list has been reached. If the end of the list has not been reached, the process 1000 proceeds to block 1014 which increments a loop variable "i" and proceeds to block 1004. If the end of the list has been reached, the process 1000 proceeds to connector D 1016 in FIG. 11A to determine the value of the generated mix mask.

Figure 11A:
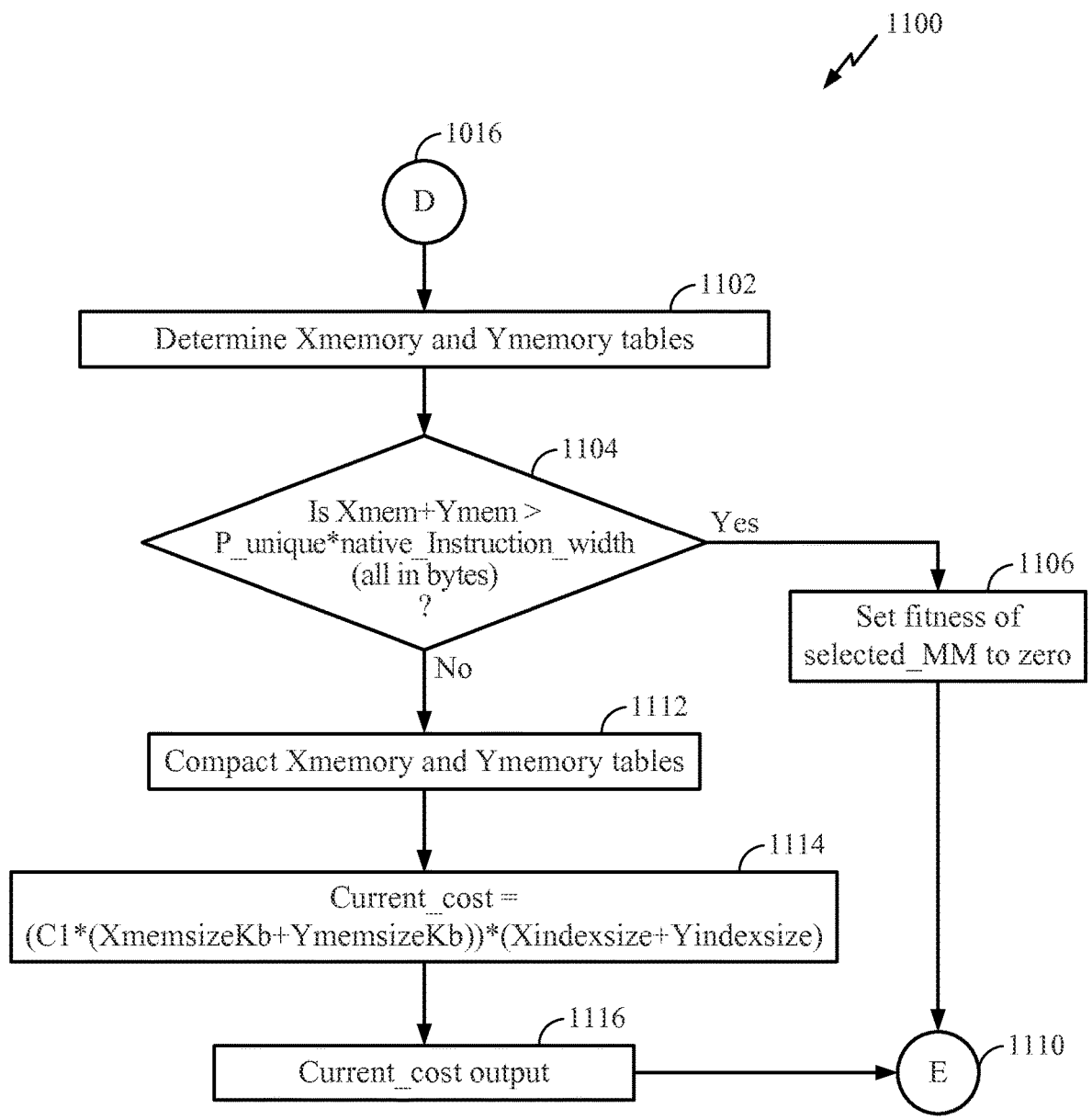
FIGS. 11A and 11B illustrate an exemplary dynamic compression and current cost calculation process in accordance with an embodiment of the invention.

FIG. 11A illustrates an exemplary dynamic compression and current cost calculation process 1100 in accordance with an embodiment of the invention. The current cost calculation process 1100 comprises calculating a current individual MM's cost function as a dynamic compression function of the selected MM and the sorted P_unique list in a similar manner as described above with regard to FIG. 9E. At block 1102, X memory and Y memory tables, such as the X patterns stored in the X memory 412 of FIG. 4 and the Y patterns stored in the Y memory 414, respectively, are determined as described above with regard to FIG. 4. At decision block 1104, a filtering heuristic is used to filter out substandard MMs, which represent unfit individuals. A mix mask is determined to be clearly unfit if the unpacked XY table generated from it exceeds in byte size the input raw instruction list size. Thus, at decision block 1104, a determination is made whether the X memory size+Y memory size is greater than the number of P_unique instructions times the native instruction width, which in this exemplary case is 32-bits. If the determination is positive, the process 1100 proceeds to block 1106 to reject the substandard mix mask. At block 1106, the fitness value for the substandard MM rejected is set to zero and the process 1100 proceeds to connector E 1110 on FIG. 11B. If at decision block 1104 the determination is negative, the process 1100 proceeds to block 1112.

At block 1112, the X memory and Y memory tables are compacted thereby reducing the X memory size and reducing the Y memory size. Block 1112 directly affects the size of the X and Y tables which in turn determines the size of indexes needed to address these tables and ultimately determines the size of the external compressed code segment. The X and Y tables are compacted using indexing compression as described with regard to FIG. 5B and FIGS. 12-14 described in more detail below. At block 1114, a current cost is generated as equal to a constant C1 times a sum of the X memory size plus Y memory size which is then multiplied by the sum of the X index size plus the Y index size. This process 1100 computes an entropy value which is represented by the current cost that is close to the actual entropy of the compressed code which is now separated into a collection of X/Y indexes and the X/Y compacted tables. Optionally at block 1114, a theoretical minimum entropy measure may be calculated and used to determine whether a further search for a better mix mask is needed or not. At block 1116, the generated current cost is made available to the WH process 1000 which then proceeds to connector E 1110 in FIG. 11B.

Figure 11B:
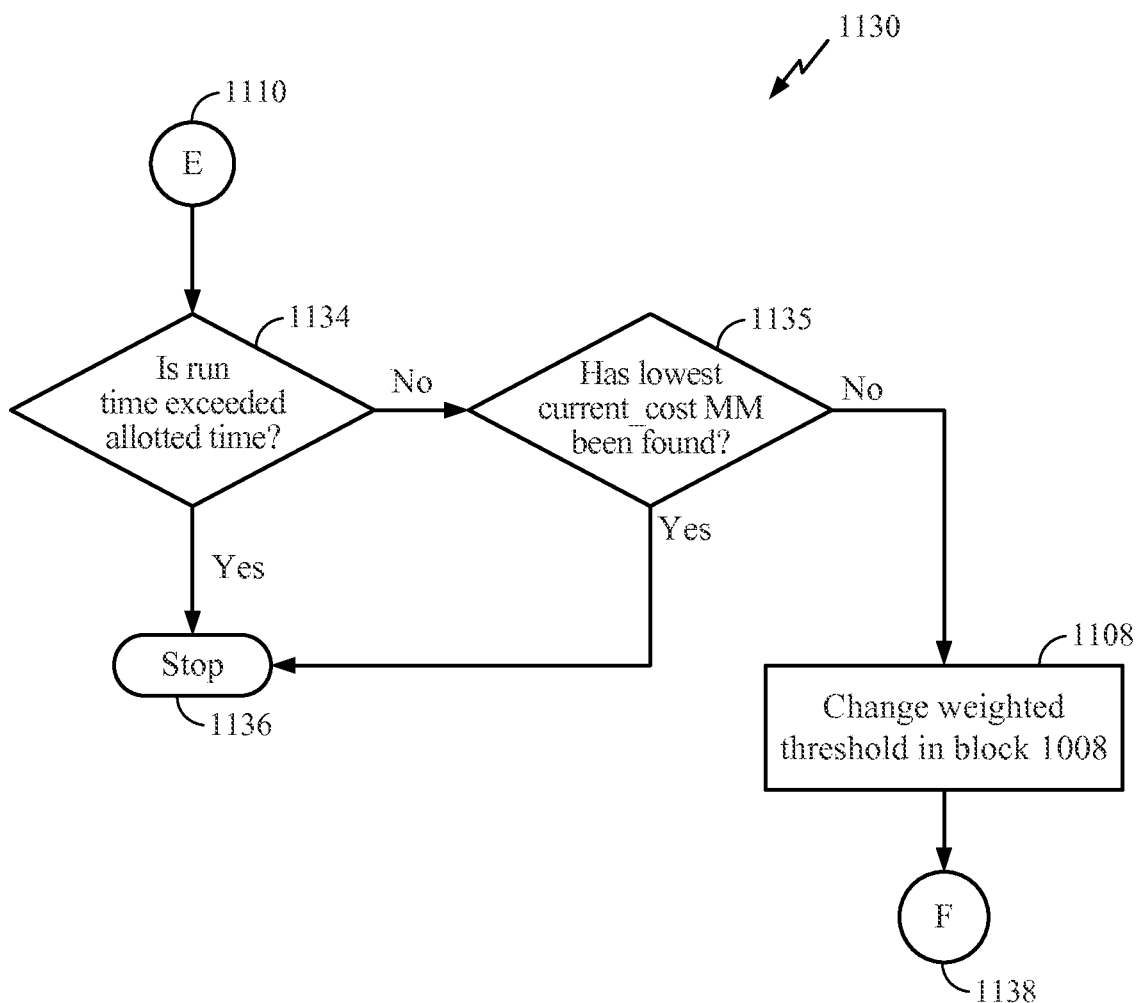

In FIG. 11B a decision process 1130 is followed to determine whether to continue or stop the search in accordance with an embodiment of the invention. At decision block 1134, a determination is made whether the run time for the WH process 1000 has exceeded an allotted time. If the run time has exceeded the allotted time, the WH process 1000 proceeds to block 1136 and stops. If the run time has not exceeded the allotted time, the WH process 1000 proceeds to decision block 1135. At decision block 1135, a determination is made whether a lowest current cost MM has been found. For example, finding only a single MM that generates a current cost less than the threshold may be insufficient reasons to terminate the WH process 1000. On the other hand, it is possible to detect that a theoretical lowest entropy bound representation has already been reached and any further search is unnecessary. In another example, a number of MMs may be found, each generating approximately the same current cost that is less than a cost threshold which also may be sufficient reason to terminate the WH process 1000 at block 1136 with selecting the MM with the lowest current cost or selecting one of a plurality of MMs each with the same acceptable lowest current cost. Otherwise at block 1135, the WH process 1000 proceeds to block 1108 and the weighted threshold of decision block 1008 of FIG. 10 is changed and the WH process 1000 proceeds to connector F 1138 of FIG. 10 at block 1004 to generate a new mix mask.

Figure 12:
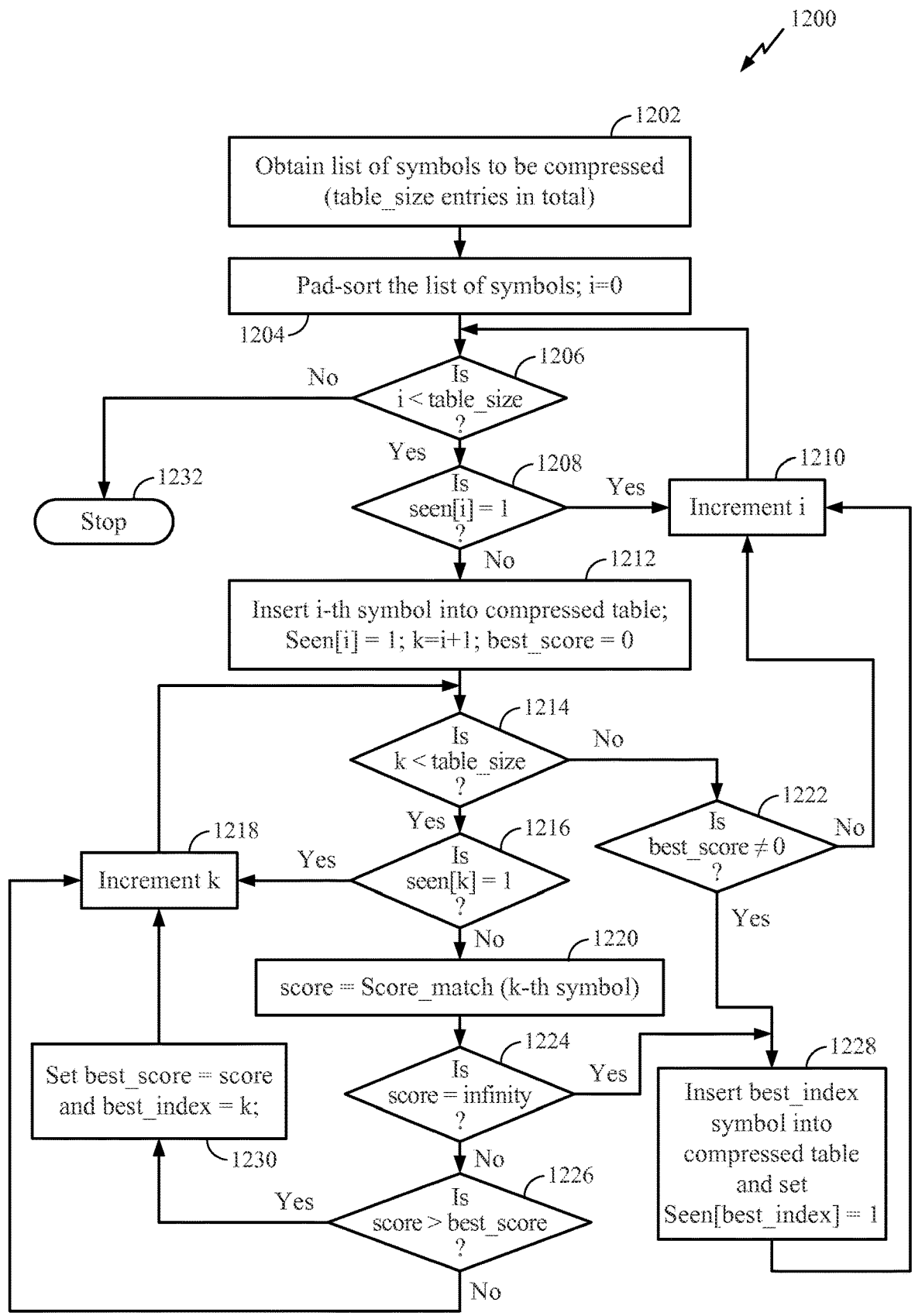
FIG. 12 illustrates a first process that is a near-exhaustive search X/Y table compaction process with pad-sort in accordance with an embodiment of the invention.
Figure 13:
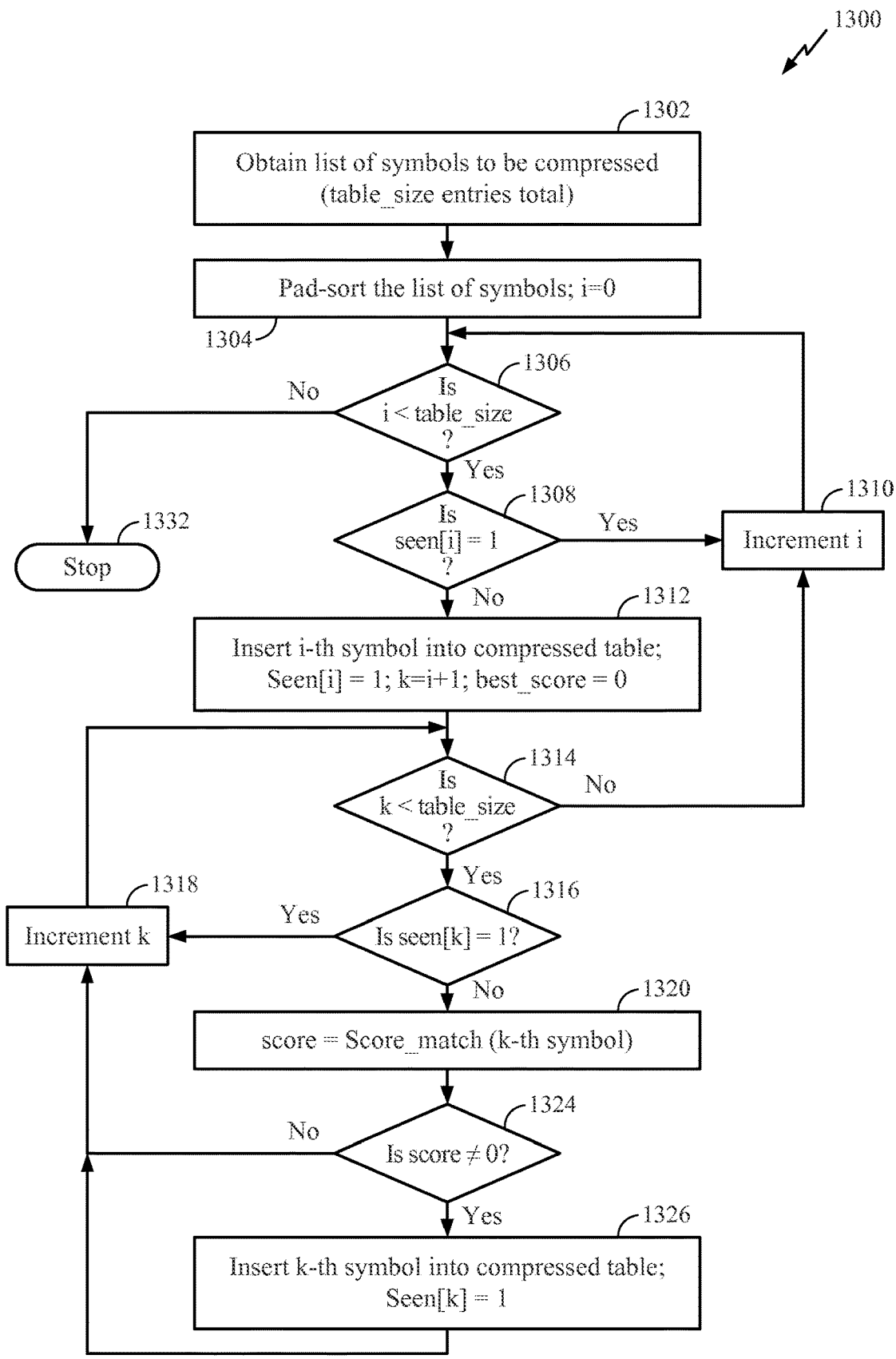
FIG. 13 illustrates a triangular X/Y table compaction with pad-sort process in accordance with an embodiment of the invention.

As noted above, near optimal selection of entries in the X/Y table combined with index compression can significantly reduce the size of X/Y tables. Two exemplary placement algorithms may be used based on a trade off between degree of compression and execution time. FIG. 12 illustrates a first process 1200 that is a near-exhaustive search and X/Y table compaction algorithm with pad sorting. FIG. 13 illustrates a triangular X/Y table compaction with pad-sort process 1300 in accordance with an embodiment of the invention. The process 1300 is an alternative to the near-exhaustive search X/Y table compaction process 1200. The heuristic process 1300 is O(n) faster than the process 1200, but may not produce as good of a compression. However, the compression results of the process 1300 may be acceptable for a number of practical applications. Moreover, a combination of the two processes might be viable in actual implementation—the faster process shown in FIG. 13 is used for determining best mask candidates, and the slower one shown in FIG. 12 is used for generating final encoding. Both of the processes 1200 and 1300 use a symbol insertion process, such as the symbol insertion process 1400 of FIG. 14, described in more detail below.

The process 1200 begins at block 1202 by obtaining the list of symbols to be compressed. This is the list of the present set of X/Y table symbols to be compacted. There are "table_size" symbols in the table. At block 1204, this list is sorted in an order which maximizes likelihood of pad overlapping. Also, at block 1204, an iteration index "i" is reset to 0.

The pad-sort operation at block 1204 is a specialized way to sort symbols in the X/Y tables to increase likelihood of pad overlapping prior to actual compaction process initiation. The pad sort operation is implemented by a quick sort algorithm, with a comparison function demanding a swap of two symbols if there is a match between one or more left most significant bytes of one symbol and one or more right most significant bytes of the other. Here length of symbol is measured in full bytes, and is left adjusted.

At decision block 1206, a determination is made whether the iteration index "i" is less than the "table_size". If the iteration index "i" is greater than or equal to the "table_size", the process 1200 proceeds to block 1232 and stops. Otherwise, the process 1200 proceeds to decision block 1208, since the i$^{th}$ symbol of the X/Y table has not been processed yet. At decision block 1208, a determination is made whether a parameter seen[i] is equal to a "1" indicating the i$^{th}$ symbol has already been processed. If seen[i]=1, the process 1200 proceeds to block 1210 in which the iteration index "i" is incremented by 1. If the symbol has not already been processed, seen[i]≠1, the process 1200 proceeds to block 1212. At block 1212, the i$^{th}$ symbol is inserted into the compressed table. Details of insertion process are described below with regard to FIG. 14. Also at block 1212, the fact of insertion is noted by setting the parameter seen[i] to 1, setting a best_score variable to 0, and initializing a new iteration index "k" to a value of i+1.

At decision block 1214, a determination is made whether the new iteration index "k" is less than the number of symbols to be compressed. If the new iteration index "k" is less than the "table_size", the process 1200 proceeds to block decision block 1216, since the k-th symbol may not have been processed yet. At decision block 1216, a determination is made whether a parameter seen[k] is equal to a "1" indicating the k$^{th}$ symbol has already been processed. If seen[k]=1, the process 1200 proceeds to block 1218 in which the new iteration index "k" is incremented by 1. If the symbol has not already been processed, seen[k]≠1, the process 1200 proceeds to block 1220. At block 1220, a match score is calculated for the k$^{th}$ symbol.

At block 1220, a score_match calculation mimics a symbol insertion process, but does not insert any symbols. Rather, the score_match calculation returns a score proportional to an amount of savings expected from placing the current symbol into the compressed table in the table's current form. This calculation process locates among remaining unprocessed symbols in the X/Y uncompressed list, the potentially best matching candidates. Score_match returns a matching indication or a very high score, such as infinity for example, if the symbol could be completely matched within existing contents, or provides a number of overlapping bytes if the symbol is matched at the end of compressed memory. If no overlap is found, a zero score is returned.

The computed score reflects a degree of savings to be expected from inserting the k-th symbol into the compressed table in its current state. At decision block 1224, a determination is made whether the score is equivalent to infinity. As noted above, a matching indication, such as a score of infinity, means that k-th symbol completely matches to the current state of compressed table, inserting it would not increase the size of the compressed table, and the process 1200 directly proceeds to insertion step in block 1228. Note, that the process of insertion in this case is a recording of current symbol offset from the beginning of compressed X/Y table which later becomes its representation in external memory. Also note, that in general, when multiple Mix Masks are used, multiple symbols that share a common prefix could have the same offset, but different length. Otherwise, at block 1226, comparison is made between the computed score and best score seen so far. If the newly computed score exceeds the best score so far, the process 1200 proceeds to block 1230. At block 1230, the present best_score is set equal to the newly computed score and a best-index is set to "k". At block 1218, the new iteration index "k" is incremented by one, and the process 1200 proceeds to decision block 1214. Once "k" reaches the end of the list (table_size), as determined at decision block 1214, the process 1200 proceeds to decision block 1222. At decision block 1222, a determination is made whether the best_score was determined. If a best score has not been determined, the iteration index "i" is incremented at block 1210, and the process 1200 continues from decision block 1206. At decision block 1222, a non-zero best_score indicates that a best fitting symbol was found, and the process 1200 proceeds to block 1228. At block 1228, the best fitting symbol is inserted into the compressed table and the fact of insertion is noted in by setting the parameter seen[best_index] array equal to "1". Once the iteration index "i" reaches table_size as determined at decision block 1206, the process is terminated at block 1232. At this point, the evaluated symbols have been inserted into the compressed table.

The process 1300 begins with steps 1302, 1304, 1306, 1308, and 1312 that are the same as steps 1202, 1204, 1206, 1208, and 1212 of FIG. 12. At block 1312, a similar insertion of i-th element is performed as is done at block 1212, but beginning with block 1314 there is no best_score that is used as is done with blocks 1214 and 1222 of FIG. 12. Instead of using a best score evaluation, at the remaining blocks of FIG. 13, the symbols between i+1 and table_size are traversed once and every element found with a non-zero score as determined at decision block 1324, is inserted into the compressed table at block 1326.

In more detail, at decision block 1314, a determination is made whether the iteration index "k" is less than the number of symbols to be compressed. If the iteration index "k" is less than the "table_size", the process 1300 proceeds to block decision block 1316, since the k-th symbol may not have been processed yet. At decision block 1316, a determination is made whether a parameter seen[k] is equal to a "1" indicating the k$^{th}$ symbol has already been processed. If seen[k]=1, the process 1300 proceeds to block 1318 in which the iteration index "k" is incremented by 1. If the symbol has not already been processed, seen[k]≠1, the process 1300 proceeds to block 1320. At block 1320, a match score is calculated for the k$^{th}$ symbol.

At block 1320, a score_match calculation mimics a symbol insertion process, but does not insert any symbols. Rather, the score_match calculation returns a score proportional to an amount of savings expected from placing the current symbol into the compressed table in the table's current form. This calculation process locates the potentially best matching candidates among remaining unprocessed symbols in the X/Y uncompressed list. Score_match returns a matching indication or a very high score, such as infinity for example, if the symbol could be completely matched within existing contents, or provides a number of overlapping bytes if the symbol is matched at the end of compressed memory. If no overlap is found, a zero score is returned.

At decision block 1324, a determination is made whether the score is equal to zero or not equal to zero. As noted above, a zero score, indicates no overlap is found and the process 1300 proceeds to block 1318 in which the iteration index "k" is incremented by 1 and then returns to decision block 1314. A non zero score causes the process 1300 to proceed to block 1326 where the k$^{th}$ symbol is inserted into the compressed table and the parameter seen[k] is set to a "1". The process 1300 then proceeds to block 1318 to increment the iteration index "k" and then returns to decision block 1314. Once "k" reaches the end of the list (table_size), as determined at decision block 1314, the process 1300 proceeds to block 1310. At block 1310, the iteration index "i" is incremented and the process 1300 continues from decision block 1306. Once the iteration index "i" reaches table_size as determined at decision block 1306, the process is terminated at block 1332. At this point, the evaluated symbols have been inserted into the compressed table.

Figure 14:
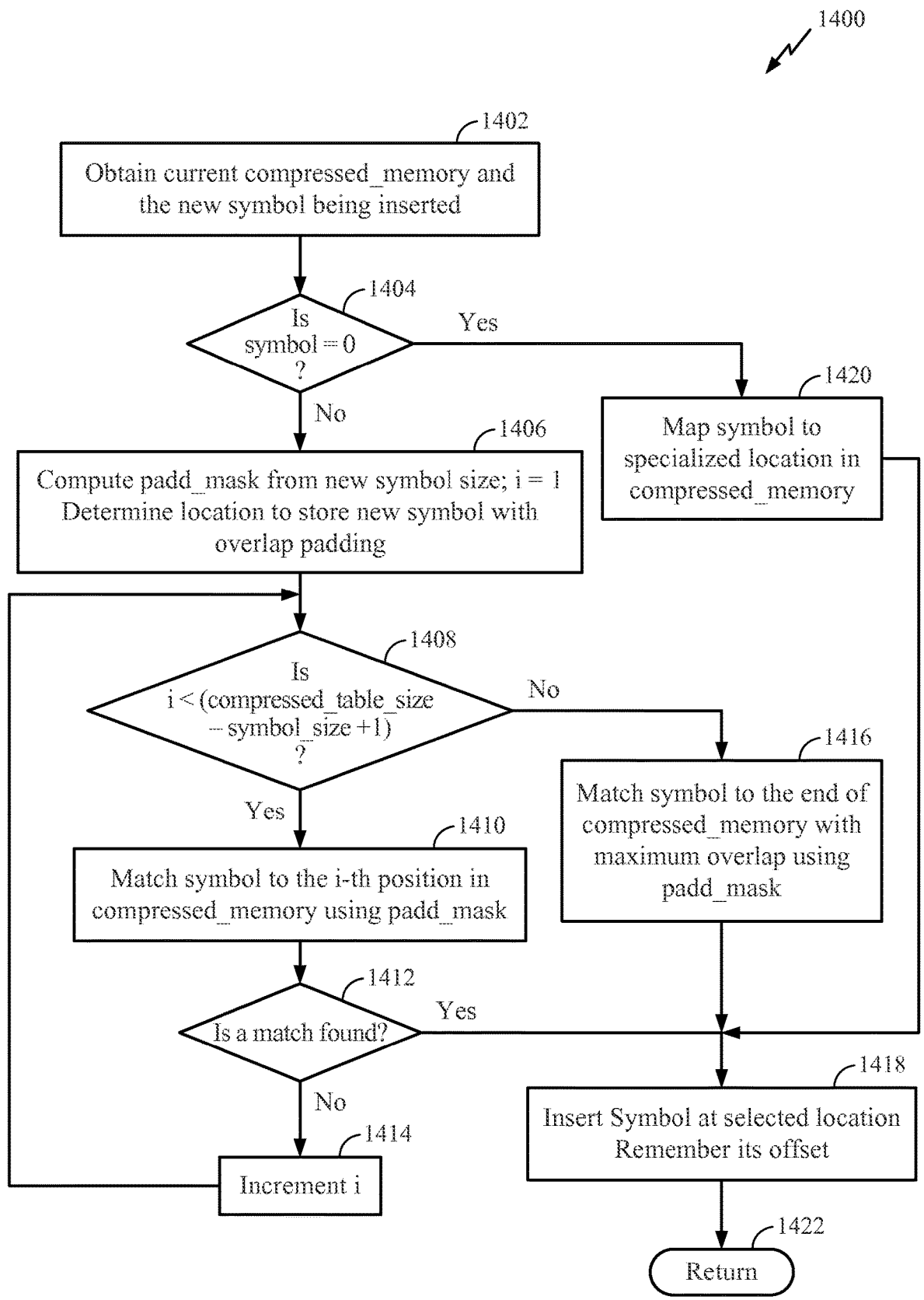
FIG. 14 illustrates a symbol insertion process in accordance with an embodiment of the invention.

FIG. 14 illustrates a symbol insertion process 1400 in accordance with an embodiment of the invention. At block 1402, the current state of compressed memory and the new symbol to be inserted are obtained. At decision block 1404, a determination is made whether the new symbol is zero. If the new symbol is zero, the symbol is mapped to a specialized position in the compressed memory at block 1420 and only one byte is stored regardless of symbol size. At decision block 1404, if the new symbol is determined to be non-zero, the process 1400 proceeds to block 1406. At block 1406, a current pad_mask is computed. The pad_mask is a binary variable used to mask out insignificant portion of the last significant byte in symbol. For instance, if the symbol being inserted has size of 15 bits, the last bit of the last byte is insignificant and needed to be ignored during comparison for placement. The pad_mask in this case is 0xfe (pad_mask always applied to the last significant byte only). At decision block 1408, a determination is made whether the iteration index "i" is less than the present compressed table size minus the new symbol size plus 1. If the determination is positive, the process 1400 proceeds to block 1410. At block 1410, the new symbol is repeatedly attempted to be placed in compressed memory checking each symbol location for matching only significant bits to the current contents with a bytewise step per iteration. Such an operation is achieved by repeatedly comparing the first significant byte of the new symbol with each byte already in the memory, and if match found for the first significant byte, other remaining bits in the new symbol are matched. The match only takes into account significant bits in the symbol, via application of the pad_mask as described above. If such a location is found at decision block 1412, the process 1400 proceeds to block 1418. At block 1418, the symbol is placed at the determined location, and the iteration index "i" becomes the symbol's offset from the beginning of the compressed table and returns at block 1422. This index will be eventually stored in external memory and utilized to locate original X/Y pattern in X/Y compressed table. If block 1416 is reached, it means the current symbol could not have been completely matched to the existing content of the compressed memory, and it needs to be placed at the end of list. In that case a maximum overlap check is performed on each byte of the symbol. If no overlap was found, the new symbol is simply placed at the end of the compressed table.

The methods described in connection with the embodiments disclosed herein may be embodied in a combination of hardware and in a software module storing non-transitory signals executed by a processor. The software module may reside in random access memory (RAM), flash memory, read only memory (ROM), electrically programmable read only memory (EPROM), hard disk, a removable disk, tape, compact disk read only memory (CD-ROM), or any other form of storage medium known in the art or to be advised in the future. A storage medium may be coupled to the processor such that the processor can read information from, and in some cases write information to, the storage medium. The storage medium coupling to the processor may be a direct coupling integral to a circuit implementation or may utilize one or more interfaces, supporting direct accesses or data streaming using downloading techniques.

While the invention is disclosed in the context of illustrative embodiments for use in processors it will be recognized that a wide variety of implementations may be employed by persons of ordinary skill in the art consistent with the above discussion and the claims which follow below.

What is claimed is:

1. A method of determining a mix mask for efficiently translating compressed instructions, the method comprising:
   breeding pairs of seed mix masks represented as genes from a seed population of seed mix masks to produce pairs of complementary offspring mix masks, wherein breeding comprises exchanging the genes at a crossover point and a first mask of the offspring mix masks is a complement of a second mask of the offspring mix masks;
   mutating the offspring mix masks to produce mutated offspring mix masks that update the seed population; and
   determining the mix mask from the updated seed population, wherein patterns of bits are combined according to the determined mix mask to translate compressed instructions of a program to executable form.

2. The method of claim 1, wherein breeding further comprises:
   randomly selecting the crossover point in a pair of seed mix masks identified as parent A and parent B; and
   producing an offspring mix mask by concatenating a leftmost set of bits from before the crossover point from either parent A or B and a rightmost set of bits starting from after the crossover point from the parent not used to select the leftmost set of bits.

3. The method of claim 1, further comprising:
   breeding based on a randomly selected crossover point in the pairs of seed mix masks.

4. The method of claim 1, wherein mutating further comprises:
   randomly inverting an individual bit in one of a pair of complementary offspring mix masks to determine a mutated offspring mix mask; and
   replacing a seed mix mask in the seed population with the mutated offspring mix mask.

5. The method of claim 1, wherein the program includes boot code, operating system code, and multiple application programs.

6. The method of claim 1, further comprising:
   determining a fitness level for each seed mix mask in the seed population using a current cost of translation hardware associated with each seed mix mask, wherein the fitness level of the seed mix mask represents a level of benefit for providing a high level of compression.

7. The method of claim 6, wherein the current cost of translation hardware is based on an X-index and Y-index memory, an X pattern memory, and a Y pattern memory.

8. The method of claim 6, further comprising:
   selecting an initial seed population of seed mix masks to include randomly selected mix masks and previously used mix masks which had a high fitness level for a previous program having instructions that are similar to the instructions used in the program.

9. The method of claim 1, wherein breeding comprises:
picking first bits in bit locations in a first bit pattern and then picking second bits in a second bit pattern corresponding to all other bit locations not picked from the first bit pattern; and
combining the picked bits to form a first offspring mix mask.

10. A translation circuit for translating compressed instructions, configured to:
breed pairs of seed mix masks represented as genes from a seed population of seed mix masks to produce pairs of complementary offspring mix masks by exchanging the genes at a crossover point and a first mask of the offspring mix masks is a complement of a second mask of the offspring mix masks;
mutate the offspring mix masks to produce mutated offspring mix masks that update the seed population;
determine a mix mask from the updated seed population, wherein patterns of bits are combined according to the determined mix mask to translate compressed instructions of a program to executable form; and
store the determined mix mask in the updated seed population in a memory.

11. The translation circuit of claim 10, configured to breed the pairs of seed mix masks by being configured to:
randomly select the crossover point in a pair of seed mix masks identified as parent A and parent B; and
produce an offspring mix mask by concatenating a leftmost set of bits from before the crossover point from either parent A or B and a rightmost set of bits starting from after the crossover point from the parent not used to select the leftmost set of bits.

12. The translation circuit of claim 10, further configured to breed the pairs of seed mix masks based on a randomly selected crossover point in the pairs of seed mix masks.

13. The translation circuit of claim 10, configured to mutate the offspring mix masks by being further configured to:
randomly invert an individual bit in one of a pair of complementary offspring mix masks to determine a mutated offspring mix mask; and
replace a seed mix mask in the seed population with the mutated offspring mix mask.

14. The translation circuit of claim 10, wherein the program includes boot code, operating system code, and multiple application programs.

15. The translation circuit of claim 10, further configured to determine a fitness level for each seed mix mask in the seed population using a current cost of translation hardware associated with each seed mix mask, wherein the fitness level of the seed mix mask represents a level of benefit for providing a high level of compression.

16. The translation circuit of claim 15, wherein the current cost of translation hardware is based on an X-index and Y-index memory, an X pattern memory, and a Y pattern memory.

17. The translation circuit of claim 15, further configured to select an initial seed population of seed mix masks to include randomly selected mix masks and previously used mix masks which had a high fitness level for a previous program having instructions that are similar to the instructions used in the program.

* * * * *